(12) United States Patent
Du et al.

(10) Patent No.: US 9,749,874 B2
(45) Date of Patent: Aug. 29, 2017

(54) MULTI-BAND MANAGEMENT OF WIRELESS RELAYING NETWORKS

(71) Applicant: QUALCOMM Incorporated, San Diego, CA (US)

(72) Inventors: Shu Du, Milpitas, CA (US); Ning Zhang, Saratoga, CA (US); Zhen Xie, San Jose, CA (US); James Simon Cho, Mountain View, CA (US); Chin-Hung Chen, San Jose, CA (US); Kai Shi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 13/943,872

(22) Filed: Jul. 17, 2013

(65) Prior Publication Data
US 2015/0023245 A1    Jan. 22, 2015

(51) Int. Cl.
*H04W 16/26* (2009.01)
*H04W 76/02* (2009.01)
(Continued)

(52) U.S. Cl.
CPC ........... *H04W 16/26* (2013.01); *H04L 45/304* (2013.01); *H04L 47/24* (2013.01);
(Continued)

(58) Field of Classification Search
CPC ..... H04W 76/02; H04W 84/04; H04W 88/10; H04L 12/725; H04L 12/851; H04L 29/06
See application file for complete search history.

(56) References Cited

U.S. PATENT DOCUMENTS

| 8,126,472 | B2 | 2/2012 | Lee et al. |
| 8,160,048 | B2 | 4/2012 | Du et al. |

(Continued)

FOREIGN PATENT DOCUMENTS

| GB | 2455074 A | 6/2009 | |
| IN | WO 2009108183 A1 * | 9/2009 | ........... H04L 45/125 |

(Continued)

OTHER PUBLICATIONS

Ranveer Chandra titled "DirCast: A practical and efficient Wi-Fi multicast system," (Chandra hereinafter) was presented in Network Protocols, 2009. ICNP 2009. 17th IEEE International Conference on , vol., No., pp. 161-170, Oct. 13-16, 2009.*

(Continued)

*Primary Examiner* — Andrew Lai
*Assistant Examiner* — Hoyet H Andrews, III
(74) *Attorney, Agent, or Firm* — Holland & Hart LLP

(57) ABSTRACT

Methods, systems, devices, and apparatuses are described for wireless communications in which first type of traffic may be transmitted from a gateway access point (AP) directly to a station. Beacon signals transmitted to the station are transmitted as part of the first type of traffic. A second type of traffic may be transmitted from the gateway AP to the station via at least one relay AP. The first type of traffic may include low-throughput traffic and may be transmitted over a long-range radio link (e.g., 2 GHz band link or sub-1 GHz band link). The second type of traffic may include high-throughput traffic and may be transmitted over at least one short-range radio link (e.g., 5 GHz band link). The gateway AP may receive low-throughput traffic directly from the station and high-throughput traffic from the station via the at least one relay AP.

39 Claims, 19 Drawing Sheets

(51) Int. Cl.
*H04L 12/725* (2013.01)
*H04L 12/851* (2013.01)
*H04W 28/02* (2009.01)
*H04W 88/10* (2009.01)
*H04W 84/04* (2009.01)
*H04W 84/12* (2009.01)

(52) U.S. Cl.
CPC ..... *H04W 28/0205* (2013.01); *H04W 76/025* (2013.01); *H04W 84/047* (2013.01); *H04W 84/12* (2013.01); *H04W 88/10* (2013.01)

(56) References Cited

U.S. PATENT DOCUMENTS

| | | | |
|---|---|---|---|
| 8,320,284 B2 | 11/2012 | Doppler et al. | |
| 2006/0205408 A1 | 9/2006 | Nakagawa et al. | |
| 2006/0209882 A1 | 9/2006 | Han et al. | |
| 2006/0218298 A1* | 9/2006 | Knapp | H04L 45/00 709/238 |
| 2007/0140191 A1* | 6/2007 | Kojima | H04W 8/005 370/338 |
| 2008/0080436 A1* | 4/2008 | Sandhu | H04W 52/241 370/338 |
| 2009/0041039 A1* | 2/2009 | Bear | H04L 45/38 370/401 |

FOREIGN PATENT DOCUMENTS

| | | | | |
|---|---|---|---|---|
| WO | WO 2006036207 A1 * | 4/2006 | ....... | H04L 29/06027 |
| WO | WO-2006036207 A1 | 4/2006 | | |
| WO | WO-2009108183 A1 | 9/2009 | | |

OTHER PUBLICATIONS

David Soldani titled "Chapter 21; Multi-hop Relay Networks" (Soldani hereinafter) was presented in WIMAX New Developments, Upena D Dalal and Y P Kosta (Edited by), ISBN: 978-953-7619-53-4, InTech, Available from: http://www.intechopen.com/books/wimax-newdevelopments/multi-hop-relay-networks , published Dec. 1, 2009.*

Ranveer Chandra titled "DirCast: A practical and efficient Wi-Fi multicast system," (Chandra hereinafter) was presented in Network Protocols, 2009. ICNP 2009. 17th IEEE International Conference on , vol., No., pp. 161-170, Oct. 13-19, 2009.*

ISA/EPO, International Search Report and Written Opinion of the International Searching Authority, Int'l App. No. PCT/US2014/045521, Oct. 23, 2014, European Patent Office, Rijswijk, NL, 11 pgs.

Wei et al, "Two-Hop-Relay Architecture for Next-Generation WWAN/WLAN Integration," IEEE Wireless Communications, Apr. 2004, pp. 24-30, vol. 11, No. 2, XP-001196396, ISSN 1536-1284, IEEE.

* cited by examiner

MULTI-BAND MANAGEMENT OF WIRELESS RELAYING NETWORKS

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communication network may include a number of network devices such as access points (APs) that can support communication for a number of wireless devices. A wireless device may communicate with a network device bi-directionally. For example, in a wireless local area network (WLAN), a wireless device (e.g., a station or STA) may communicate with an AP via downlink and uplink. The downlink (or forward link) refers to the communication link from the AP to the STA, and the uplink (or reverse link) refers to the communication link from the STA to the AP.

In WLANs or Wi-Fi networks, new devices (e.g., IEEE 802.11-ac compliant devices) are being deployed that provide increased end-to-end throughput. Because of transmit power regulations and/or radio propagation characteristics, for example, these new devices may not be able to provide sufficient coverage (i.e., range) in some situations. One approach to address this issue is to use wireless relays (e.g., relay APs) to increase coverage by extending the role of a legacy or gateway AP to the wireless relays. Extending the role of the gateway AP, however, puts a great burden on the wireless relays, which in some cases may have power and/or processing limitations. Thus, new mechanisms may be needed to extend the coverage provided by these new devices without placing too much of a burden on the wireless relays used to extend the coverage.

SUMMARY

The described features generally relate to one or more improved methods, devices, systems, and/or apparatuses for wireless communications.

In one method for wireless communications that uses multi-band management of wireless relaying networks, a first type of traffic may be transmitted from a gateway AP directly to a station. Beacon signals transmitted to the station are transmitted as part of the first type of traffic. A second type of traffic may be transmitted from the gateway AP to the station via at least one relay AP. The first type of traffic may include low-throughput traffic (e.g., low bursts of broadcast, multicast, and/or unicast traffic) and may be transmitted over a long-range radio link (e.g., 2 GHz band link or sub-1 GHz band link). The second type of traffic may include high-throughput traffic (e.g., high bursts of broadcast and/or unicast data traffic, broadcast and/or unicast traffic with low latency) and may be transmitted over at least one short-range radio link (e.g., 5 GHz band link) The gateway AP may receive low-throughput traffic directly from the station over a long-range radio link and high-throughput traffic from the station via the at least one relay AP and over at least one short-range radio link.

A method for wireless communications includes transmitting a first type of traffic from a gateway access point directly to a station, where beacon signals transmitted to the station are transmitted as part of the first type of traffic. The method also includes transmitting a second type of traffic from the gateway access point to the station via at least one relay access point. In some embodiments of the method, transmitting the first type of traffic includes transmitting low-throughput traffic, and transmitting the second type of traffic includes transmitting high-throughput traffic. In some embodiments of the method, transmitting the first type of traffic includes transmitting the first type of traffic over a long-range radio link. The long-range radio link may include a 2 GHz band link or a sub-1 GHz band link. In some embodiments, transmitting the second type of traffic includes transmitting the second type of traffic over at least one short-range radio link. The at least one short-range radio link may include a 5 GHz band link.

In some embodiments of the method, transmitting the first type of traffic includes transmitting one or more of low bursts of broadcast traffic, low bursts of multicast traffic, and low bursts of unicast traffic. In some embodiments of the method, transmitting the second type of traffic includes transmitting one or more of high bursts of unicast data traffic, high bursts of broadcast data traffic, unicast traffic with low latency, and broadcast traffic with low latency. The method may further include receiving low-throughput traffic at the gateway access point directly from the station over a long-range radio link, and receiving high-throughput traffic at the gateway access point from the station via the at least one relay access point and over at least one short-range radio link.

A method for wireless communications includes receiving a first type of traffic at a station directly from a gateway access point, where beacon signals received by the station are received as part of the first type of traffic. The method also includes receiving a second type of traffic at the station from the gateway access point via at least one relay access point. In some embodiments of the method, receiving the first type of traffic includes receiving low-throughput traffic, and receiving the second type of traffic includes receiving high-throughput traffic. In some embodiments of the method, receiving the first type of traffic includes receiving the first type of traffic over a long-range radio link. The long-range radio link may include a 2 GHz band link or a sub-1 GHz band link. In some embodiments of the method, receiving the second type of traffic includes receiving the second type of traffic over at least one short-range radio link. The at least one short-range radio link may include a 5 GHz band link.

In some embodiments of the method, receiving the first type of traffic includes receiving one or more of low bursts of broadcast traffic, low bursts of multicast traffic, and low bursts of unicast traffic. In some embodiments of the method, receiving the second type of traffic includes receiving one or more of high bursts of unicast data traffic, high bursts of broadcast data traffic, unicast traffic with low latency, and broadcast traffic with low latency. The method may further include transmitting low-throughput traffic from the station directly to the gateway access point over a long-range radio link, and transmitting high-throughput traffic from the station to the gateway access point via the at least one relay access point and over at least one short-range radio link.

A device for wireless communications includes a gateway access point configured to transmit a first type of traffic directly to a station, where beacon signals transmitted to the station are transmitted as part of the first type of traffic, and to transmit a second type of traffic to the station via at least one relay access point. In some embodiments of the device, the gateway access point is configured to transmit the first type of traffic directly to the station over a 2 GHz band link or a sub-1 GHz band link. In some embodiments of the device, the gateway access point is configured to transmit the second type of traffic to the at least one relay access point over at least one 5 GHz band link. In some embodiments of the device, the first type of traffic includes one or more of low bursts of broadcast traffic, low bursts of multicast traffic, and low bursts of unicast traffic, and the second type of traffic includes one or more of high bursts of unicast data traffic, high bursts of broadcast data traffic, unicast traffic with low latency, and broadcast traffic with low latency.

A device for wireless communications includes a station configured to receive a first type of traffic directly from a gateway access point, where beacon signals received by the station are received as part of the first type of traffic, and to receive a second type of traffic from the gateway access point via at least one relay access point. In some embodiments of the device, the station is configured to receive the first type of traffic directly from the gateway access point over a 2 GHz band link or a sub-1 GHz band link. In some embodiments of the device, the station is configured to receive the second type of traffic from the gateway access point via the at least one relay access point and over at least one 5 GHz band link. In some embodiments of the device, the first type of traffic includes one or more of low bursts of broadcast traffic, low bursts of multicast traffic, and low bursts of unicast traffic, and the second type of traffic includes one or more of high bursts of unicast data traffic, high bursts of broadcast data traffic, unicast traffic with low latency, and broadcast traffic with low latency.

A system for wireless communications includes a station, a gateway access point communicatively coupled with the station, where the gateway access point is configured to transmit a first type of traffic directly to the station over a long-range radio link, and where beacon signals transmitted to the station are transmitted as part of the first type of traffic, and at least one relay access point communicatively coupled with the gateway access point and the station, where the gateway access point is configured to transmit a second type of traffic to the station via the at least one relay access point and over at least one short-range radio link.

An apparatus for wireless communications includes means for transmitting a first type of traffic from a gateway access point directly to a station, where beacon signals transmitted to the station are transmitted as part of the first type of traffic. The apparatus also includes means for transmitting a second type of traffic from the gateway access point to the station via at least one relay access point. In some embodiments of the apparatus, the means for transmitting the first type of traffic includes means for transmitting low-throughput traffic, and the means for transmitting the second type of traffic includes means for transmitting high-throughput traffic. In some embodiments of the apparatus, the means for transmitting the first type of traffic includes means for transmitting the first type of traffic over a 2 GHz band link or a sub-1 GHz band link. In some embodiments of the apparatus, the means for transmitting the second type of traffic includes means for transmitting the second type over at least one 5 GHz band link.

In some embodiments of the apparatus, the means for transmitting the first type of traffic includes means for transmitting one or more of low bursts of broadcast traffic, low bursts of multicast traffic, and low bursts of unicast traffic, and the means for transmitting the second type of traffic includes means for transmitting one or more of high bursts of unicast data traffic, high bursts of broadcast data traffic, unicast traffic with low latency, and broadcast traffic with low latency.

An apparatus for wireless communications includes means for receiving a first type of traffic at a station directly from a gateway access point, where beacon signals received by the station are received as part of the first type of traffic. The apparatus also includes means for receiving a second type of traffic at the station from the gateway access point via at least one relay access point. In some embodiments of the apparatus, the means for receiving the first type of traffic includes means for receiving low-throughput traffic, and the means for receiving the second type of traffic includes means for receiving high-throughput traffic. In some embodiments of the apparatus, the means for receiving the first type of traffic includes means for receiving the first type of traffic over a 2 GHz band link or a sub-1 GHz band link. In some embodiments of the apparatus, the means for receiving the second type of traffic includes means for receiving the second type over at least one 5 GHz band link.

In some embodiments of the apparatus, the means for receiving the first type of traffic includes means for receiving one or more of low bursts of broadcast traffic, low bursts of multicast traffic, and low bursts of unicast traffic, and the means for receiving the second type of traffic includes means for receiving one or more of high bursts of unicast data traffic, high bursts of broadcast data traffic, unicast traffic with low latency, and broadcast traffic with low latency.

A computer program product includes a non-transitory computer-readable medium having code for causing at least one computer to transmit a first type of traffic from a gateway access point to a station, where beacon signals transmitted to the station are transmitted as part of the first type of traffic. The non-transitory computer-readable medium also has code for causing the at least one computer to transmit a second type of traffic from the gateway access point to the station via at least one relay access point.

A computer program product includes a non-transitory computer-readable medium having code for causing at least one computer to receive at a station a first type of traffic directly from a gateway access point, where beacon signals received by the station are received as part of the first type of traffic. The non-transitory computer-readable medium also has code for causing the at least one computer to receive at the station a second type of traffic from the gateway access point via at least one relay access point.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
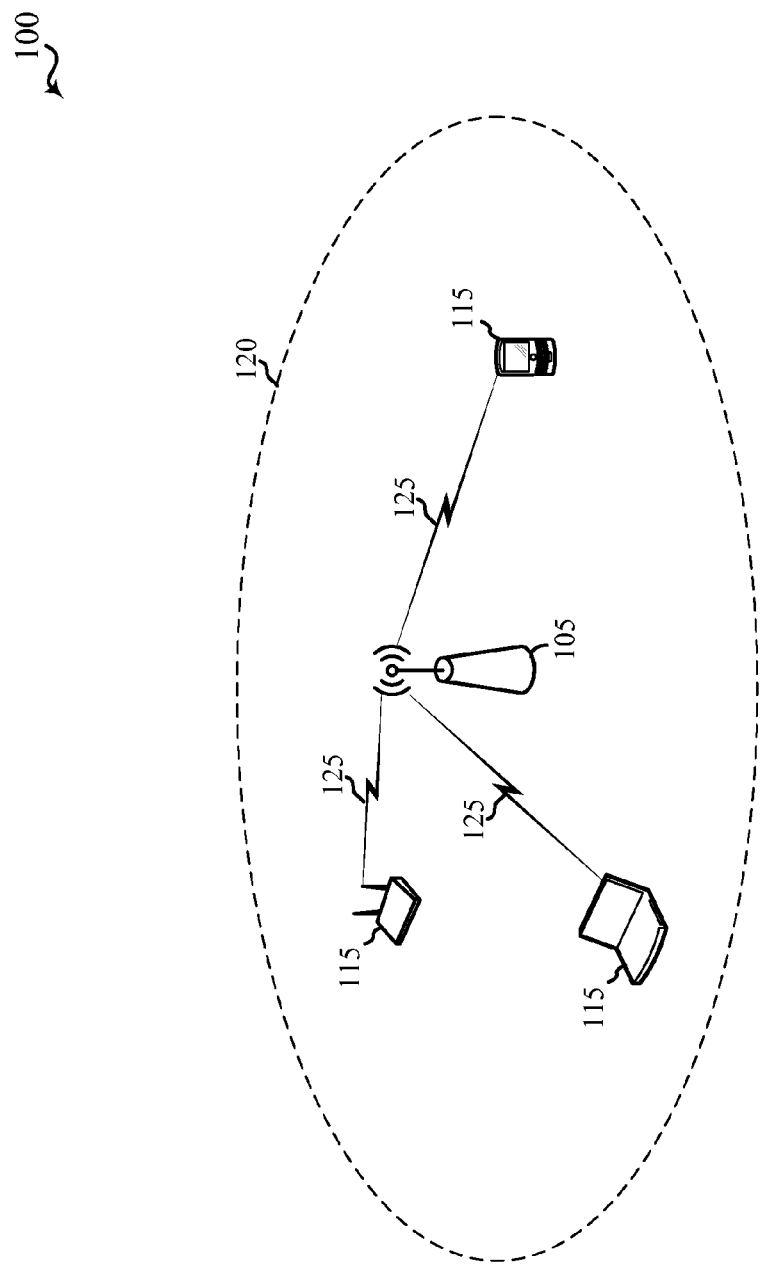
FIG. 1 shows a diagram that illustrates an example of a wireless local area network (WLAN) according to various embodiments.

Described embodiments are directed to methods, devices, systems, and apparatuses for wireless communications in which the coverage of a legacy or gateway AP may be extended by using multi-band management of wireless relaying networks. The gateway AP may be part of a WLAN or Wi-Fi network that uses new devices (e.g., IEEE 802.11-ac compliant devices) able to operate on a 5 GHz (5G) band. The 5G band provides ample spectrum and less interference than other bands. Devices operating in the 5G band may reach 1 Gigabits-per-second end-to-end throughput, similar to the throughput capability of standard Ethernet. However, even with the greater link capacity provided by these new devices, the coverage of the Wi-Fi network may remain limited because of regulations in transmit power and/or the characteristics of radio propagation, for example. One approach to extend the coverage of the Wi-Fi network is to use wireless relays (e.g., relay APs) to extend the capabilities of the gateway AP.

Wireless Distribution System (WDS) is one of the most commonly used techniques to wirelessly extend the coverage of a Wi-Fi network. In a WDS, multiple APs (i.e., AP nodes) may be deployed and a station may associate with the nearest AP. The APs may communicate with each other wirelessly, including multi-hop communication. The APs may organize into a mesh network (e.g., by using IEEE 802.11s) to provide the extended coverage and to secure each relaying link.

Another relaying technique is Wi-Fi Direct, or Peer-to-Peer (P2P). In this technique, a Wi-Fi Direct enabled device (e.g., station) in the network can be elected to operate as a soft-AP or Group Owner (GO) and the other stations may associate with a nearby GO to effectively extend the coverage of the gateway AP. The GO may help in relaying traffic between the associated station(s) and the gateway AP.

For these relaying techniques, corresponding L2 bridging or L3 routing may need to be configured correctly in the relaying nodes for packets between the associated stations and APs to be passed through transparently without intervention from higher layers.

Moreover, in these relaying techniques, the role of the gateway AP is effectively extended to the WDS AP or to the GO. That is, the WDS AP or the GO may still need to perform the functions of the gateway AP. For example, the WDS AP or the GO may need to broadcast beacons to associated stations, and relay multicast or broadcast traffic for the gateway AP, if there is any. The relaying of the broadcast beacons may put a burden on the relay APs (e.g., WDS AP or GO) since these devices may sometimes have power and/or processing (e.g., central processing unit or CPU) limitations just like a typical station. Moreover, beacon relaying may add to the complexity of the network management, including coordinating a power save mode of the station with the operations of the AP providing the relaying function. For example, if the associated station wants to enter into a power save mode (e.g., sleep mode), the relay AP may need to remain awake (e.g., not enter a power save mode) to help buffer data from the gateway AP that is destined for the station. Moreover, the relay AP may need to generate a traffic indication map (TIM) to notify the station about the packet arrival. If the relay AP is not able to perform these tasks, the power performance of the network may be compromised.

To address some of the issues described above, the Wi-Fi network may be implemented using multiple bands for communication since most Wi-Fi network devices (e.g., APs) and wireless devices (e.g., STAs) now typically support multiple communications bands. For example, Wi-Fi devices may have multiple radios installed that allow the device to operate concurrently in multiple channels or bands (e.g., 2 GHz (2G) band, 5G band, sub-1 GHz (sub-1G) band). Operating in the 5G band provides sufficient bandwidth and throughput but limited coverage. To obtain better coverage, other bands with greater coverage may be used concurrently with the 5G band. For example, the coverage of the 2G band is greater than the coverage of the 5G band and both bands may be used concurrently to provide both sufficient throughput and coverage. The coverage of the sub-1G band and of the TV-white space band (e.g., IEEE 802.11af) is greater than the coverage of the 2G band and those bands may also be used concurrently with the 5G band.

One approach is therefore to allow the gateway AP to associate with a station and communicate with that station concurrently over separate and independent paths or bands. For example, the gateway AP may communicate directly with a station over a long-range Wi-Fi link (e.g., 2G band link or sub-1G band link) to transmit certain types of traffic (e.g., beacon signals, low-throughput traffic). The gateway AP may also communicate with the station indirectly via at least one wireless relay (e.g., relay AP) and over at least one short-range Wi-Fi link (e.g., 5G band link) to transmit other types of traffic (e.g., higher throughput traffic, low latency traffic). This approach may provide both the appropriate throughput and coverage that is desired for a particular situation. However, the beacon signals that are typically transmitted or broadcast to the station are transmitted directly over the long-range radio link and are not relayed over the relay APs. Thus, the transmission of beacon signals is retained by the gateway AP to reduce the burden on the relay APs. Other functions of the gateway AP are extended to the relay APs.

In other aspects of the proposed approach, the station may be placed in a power save mode and may wake up periodically to listen to the beacon signals transmitted by the gateway AP over the long-range radio link. The relay AP may also be placed in a sleep or power save mode when there is no other station to serve, and may wake up to listen to beacon signals in its own long-range radio link (when such a link is available). When a beacon signal in the long-range radio link includes a TIM to indicate that there is some buffered data for the station, then both the station and the relay AP mat wake up and the station may notify the gateway AP so that the data may be transmitted to the station.

The various techniques described herein for wireless communications using multi-band management of wireless relaying networks are described with respect to WLAN or Wi-Fi networks. A WLAN or Wi-Fi network may refer to a network that is based on the protocols described in the various IEEE 802.11 standards (e.g., IEEE 802.11a/g, 802.11n, 802.11ac, 802.11ah, etc.), for example. However, the same or similar techniques may also be used in any wireless network (e.g., a cellular network). For example, the same or similar techniques may be used for various wireless communications systems such as cellular wireless systems, Peer-to-Peer wireless communications, ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), Wi-Fi, IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a diagram 100 that includes an example of a WLAN or Wi-Fi network. An access point (AP) 105 (i.e., network device) may generate a wireless local area network, such as an IEEE 802.11 network, with client devices 115. The client devices 115, also referred to as wireless stations, stations, or STAs, may be distributed or deployed within a coverage area 120 of the WLAN. Each of the stations 115 may associate and communicate (using communication links 125) with the AP 105 over a particular band. The AP 105 may support one band (e.g., includes one radio) or may support multiple bands (e.g., includes multiple radios). Similarly, the stations 115 may support one band or multiple bands. When multiple bands are supported by the AP 105 and a station 115, at least one of the bands may be selected for communication between the two devices.

Figure 2A:
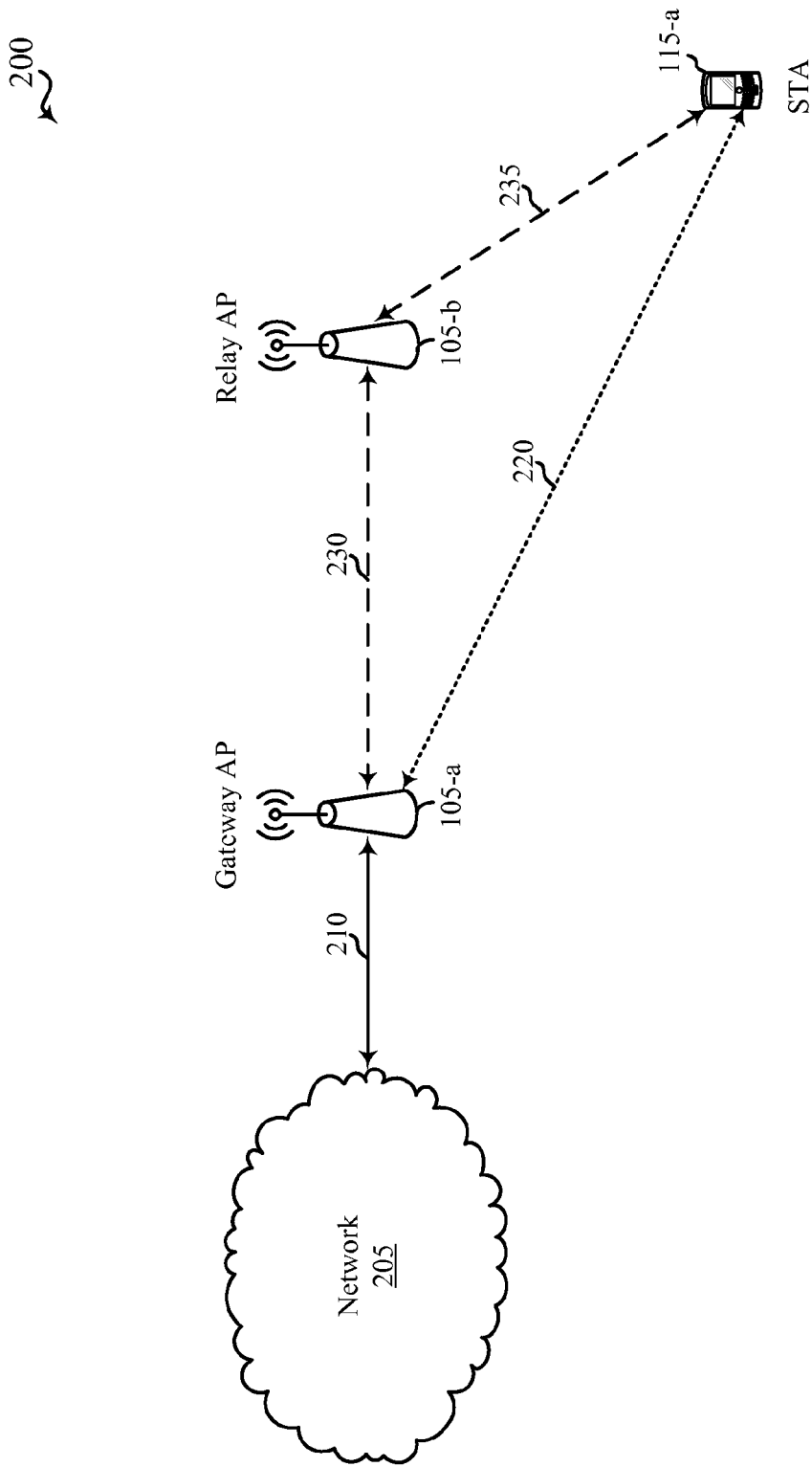
FIG. 2A shows a diagram that illustrates an example of a multi-band wireless relaying network according to various embodiments.
Figure 2B:
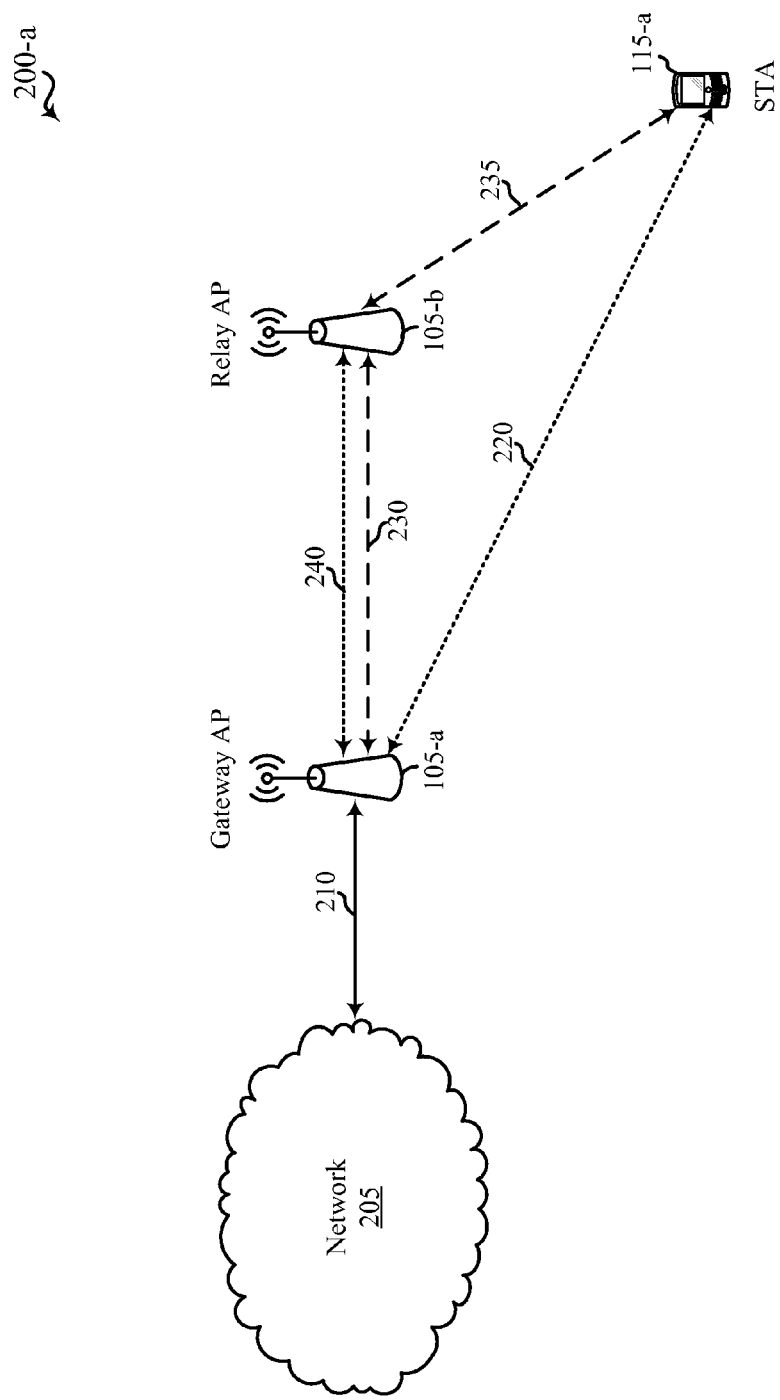
FIG. 2B shows a diagram that illustrates another example of a multi-band wireless relaying network according to various embodiments.
Figure 2C:
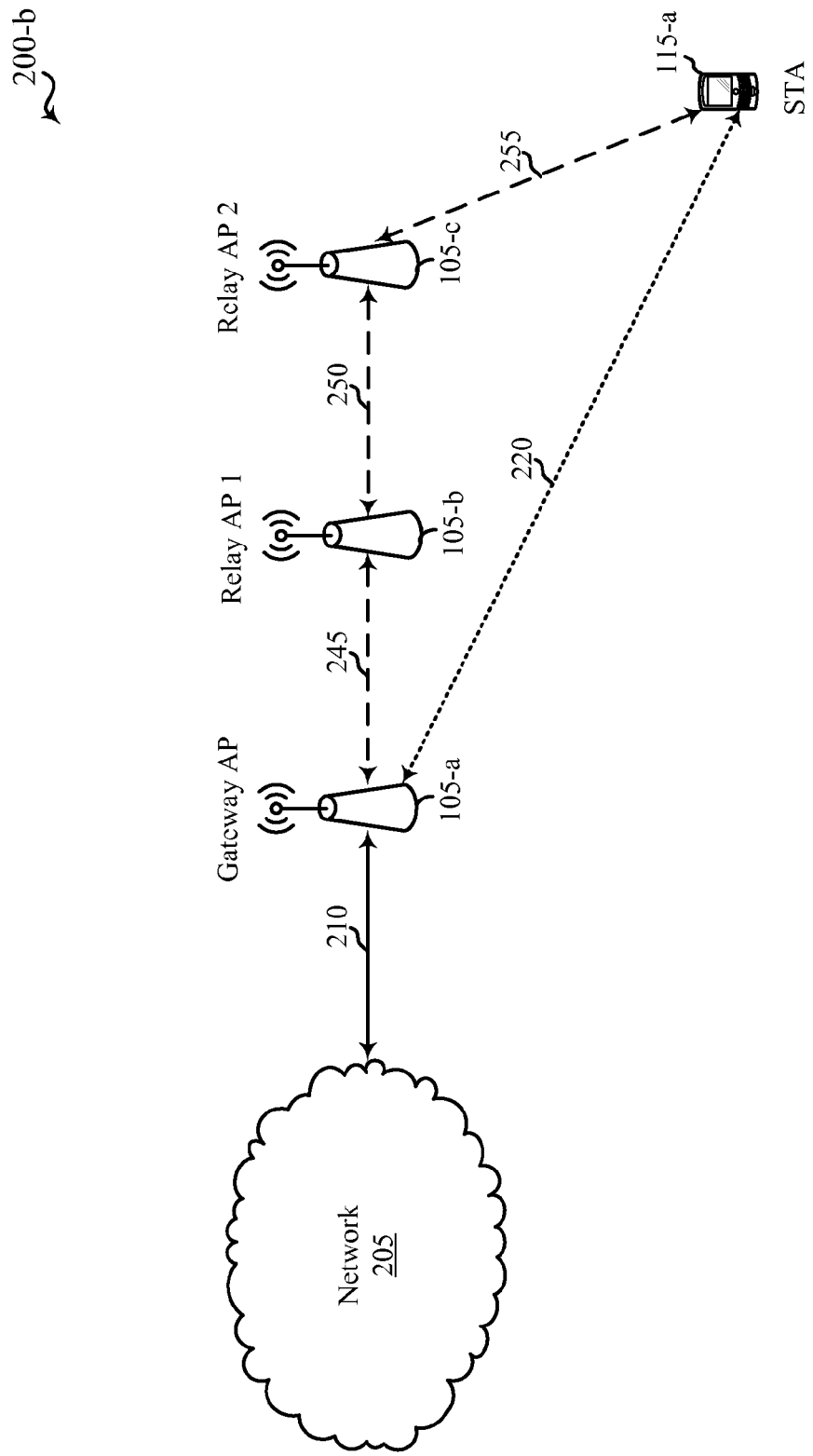
FIG. 2C shows a diagram that illustrates yet another example of a multi-band wireless relaying network according to various embodiments.

The coverage area 120 may vary depending on the band used between the AP 105 and a station 115 for communication. For example, a high-throughput short-range radio link (e.g., 5G band link) may provide less coverage than a low-throughput long-range radio link (e.g., 2G radio link) To enable both high throughput and extended coverage, wireless relaying (e.g., relay APs) using multiple high-throughput short-range radio links may be used. However, as described above, the relaying of beacon signals broadcast by the AP 105 can place a great burden on the relay APs. Another approach is to enable communication between the AP 105 and a station 115 to occur concurrently over multiple bands while also using wireless relaying. In this scenario, a low-throughput long-range radio link may be used to communicate certain types of traffic, including beacon signals, while multiple high-throughput short-range radio links may be used to communicate other types of traffic, including high burst or low-latency traffic. With this approach, both high throughput and extended coverage may be obtained without the need to burden the relaying APs. FIGS. 2A-2C described below provide additional details on various aspects of multi-band management of wireless relaying networks.

FIG. 2A shows a diagram 200 that includes an example of a WLAN using multi-band management of wireless relaying networks. A gateway AP 105-a is shown that may be an example of the AP 105 of FIG. 1. Also shown is a station (STA) 115-a that may be an example of the stations 115 of FIG. 1. In addition, a relay AP 105-b is shown that may be an example of the AP 105 of FIG. 1 configured to provide relaying functions. In some instances, the relay AP 105-b may be a station or other similar device configured to provide at least some of the functionality of a relaying AP.

The WLAN shown in FIG. 2A may correspond to a home or business wireless relaying network for which at least one relay AP 105-*b* may be needed to provide sufficient coverage (i.e., to extend the coverage of the gateway AP 105-*a*). In these instances, the relay AP 105-*b* may be placed in a location within the home or business that may optimize the wireless coverage provided by the network. The relay AP 105-*b* may be a form-factor device that can be plugged to an outlet and has no power constraints. In other cases, however, the relay AP 105-*b* may be an appliance or another station and may have considerable power and/or CPU limitations.

The gateway AP 105-*a* may be configured to communicate with a network 205. The network 205 may be a data or content network and/or a wide area network. An example of the network 205 may be the internet. The gateway AP 105-*a* may use a wired and/or wireless communication protocol to establish a communications link 210 with the network 205. For example, the gateway AP 105-*a* may use one or more of a cable modem, a digital service link (DSL) modem, an optical communications link such as a T1 or T3 line, or any other form of wired communications protocol to communicatively couple with the network 205. In another example, the gateway AP 105-*a* may be wirelessly coupled to a cellular network (e.g., 3G, 4G). The gateway AP 105-*a* may include a wired (e.g., Ethernet) or wireless (e.g., Wi-Fi) router, or a cellular to Wi-Fi hotspot device to allow the station 115-*a* to communicate with another network through the gateway AP 105-*a*.

The station 115-*a* may be configured to associate with the gateway AP 105-*a* and to communicate directly with the gateway AP 105-*a* over a communications link 220. The communications link 220 may be a long-range, low-throughput radio link that is used to communicate certain types of traffic between the gateway AP 105-*a* and the station 115-*a*. The communications link 220 may use the 2G band or the sub-1G band, which provide longer range than the 5G band. Although not shown in FIG. 2A, both the gateway AP 105-*a* and the station 115-*a* may include a radio that supports transmissions and/or receptions over the band (e.g., 2G band or the sub-1G band) used by the communications link 220.

Communications between the gateway AP 105-*a* and the station 115-*a* may include the transmission of beacon signals directly to the station 115-*a*. In this way, beacon signals are not relayed to the station 115-*a* through the relay AP 105-*b* in order to relieve the relay AP 105-*b* from this function. Communications from the gateway AP 105-*a* to the station 115-*a* may include, for example, the transmission of low bursts of broadcast traffic, low bursts of multicast traffic, and/or low bursts of unicast traffic. Low bursts of broadcast traffic may generally refer to bursts of broadcast traffic that are less than a threshold value. For example, the size of a traffic burst (e.g., the number of bits or bytes of traffic within a specified period of time) may be compared by the gateway AP 105-*a* to a threshold value to determine whether the traffic burst is low (e.g., less than the threshold value) or high (e.g., greater than the threshold value). In some instances, a low burst of traffic may occur when the traffic burst is less than a first threshold value (i.e., low threshold) and a high burst of traffic may occur when the traffic burst is greater than a second threshold value (i.e., high threshold). A traffic burst may result from data or other information stored in a buffer, queue, or some other storage device that is transmitted within a short amount of time. Low bursts of multicast (or unicast) traffic may also refer to traffic bursts that are less than a threshold value. Broadcast, multicast, and unicast traffic may each use the same or a different threshold value to determine whether the respective bursts are low bursts or high bursts. These threshold values may be adapted over time based on transmission and/or operating conditions, for example. The gateway AP 105-*a* may be configured to identify which traffic to communicate directly to the station 115-*a* by, for example, identifying the contents of the traffic (e.g., video traffic, email traffic) and/or determining whether a buffer or queue level exceeds a threshold level (e.g., low-burst traffic, high-burst traffic). For some traffic, such as email traffic or low-burst traffic, for example, the gateway AP 105-*a* may transmit the traffic directly to the station 115-*a* over the communications link 220. In these cases, the relay AP 105-*b* may be fully off duty and need not handle any aspect of these transmissions. The gateway AP 105-*a* may identify other traffic, such as video traffic or high-burst traffic, for example, that it may transmit to the station 115-*a* indirectly via the relay AP 105-*b*.

Like the gateway AP 105-*a*, the station 115-*a* may also be configured to identify which traffic to communicate directly to the gateway AP 105-*a*. The station 115-*a* may identify the traffic to communicate directly to the gateway AP 105-*a* by, for example, identifying the contents of the traffic (e.g., video traffic, email traffic) and/or determining whether a buffer or queue level exceeds a threshold level (e.g., low burst traffic, high burst traffic). For some traffic, such as email traffic, for example, the station 105-*a* may transmit the traffic directly to the gateway AP 105-*a* over the communications link 220. In these cases, the relay AP 105-*b* may be fully off duty and need not handle any aspect of these transmissions. The station 115-*a* may identify other traffic, such as video traffic, for example, that it may transmit to the gateway AP 105-*a* indirectly via the relay AP 105-*b*.

The station 115-*a* may be configured to associate with the relay AP 105-*b* and to communicate directly with the relay AP 105-*b* over a communications link 235. The communications link 235 may be a short-range, high-throughput radio link. The communications link 235 may use the 5G band, which provides shorter range than the 2G or sub-1G bands but higher throughput. Although not shown in FIG. 2A, both the relay AP 105-*b* and the station 115-*a* may include a radio that supports transmissions and/or receptions over the band (e.g., 5G band) used by the communications link 235.

The relay AP 105-*b* may be configured to extend some of the functionality of the gateway AP 105-*a* and to communicate directly with the gateway AP 105-*a* over a communications link 230. The communications link 230 may be a short-range, high-throughput radio link. The communications link 230 may use the 5G band, which provides shorter range than the 2G or sub-1G bands but higher throughput. Although not shown in FIG. 2A, both the relay AP 105-*b* and the gateway AP 105-*a* may include a radio that supports transmissions and/or receptions over the band (e.g., 5G band) used by the communications link 230. In some instances, the communications link 230 may use a different channel within the 5G band from the channel used by the communications link 235. Using different channels may reduce interference between the two communications links when using the same band.

Communications from the gateway AP 105-*a* to the station 115-*a* via the relay AP 105-*b* may include, for example, the transmission of high bursts of unicast data traffic, high bursts of broadcast data traffic, unicast traffic with low latency, and/or broadcast traffic with low latency. High bursts of unicast traffic may generally refer to bursts of unicast traffic that are greater than a threshold value. For example, the size of a traffic burst may be compared by the gateway AP 105-*a* to a threshold value to determine whether the traffic burst is low (e.g., less than the threshold value) or high (e.g., greater than the threshold value). In some instances, a low burst of traffic may occur when the traffic burst is less than a first threshold value (i.e., low threshold) and a high burst of traffic may occur when the traffic burst is greater than a second threshold value (i.e., high threshold). High bursts of broadcast traffic may also refer to traffic bursts that are greater than a threshold value (e.g., a high threshold). Unicast and broadcast traffic may each use the same or a different threshold value to determine whether the respective bursts are low bursts or high bursts. These threshold values may be adapted over time based on transmission and/or conditions, for example. On the other hand, low latency unicast (or broadcast) traffic may refer to traffic with latency that is less than a threshold value. For example, the gateway AP 105-a may compare the latency (e.g., system-level time delay) of certain traffic to a threshold value to determine whether the latency is low (e.g., less than the threshold value) or high (e.g., greater than the threshold value). In some instances, a low latency threshold value (to determine low latency) and a separate high latency threshold value (to determine high latency) may be used. Unicast and broadcast traffic may each use the same or a different threshold value to determine whether the latency is low or high. As with threshold values used to determine low and high bursts of traffic, latency threshold values may be adapted over time based on transmission and/or operating conditions, for example.

While the direct and indirect (i.e., relayed) communications paths between the gateway AP 105-a and the station 115-a are described in terms of the 2G and 5G bands, the disclosure need not be so limited. The direct communication between gateway AP 105-a and the station 115-a may use any band that provides longer range than the band used for indirect communication (e.g., via the relay AP 105-b) between gateway AP 105-a and the station 115-a.

The communications link 220 may also be used for control and signaling traffic. For example, the communications link 220 may be used to set up some or all of the relay links parameters that are used to provide the relay functions of the relay AP 105-b. When handling multicast data received through both the communications links 220 and 235, the station 115-a may be configured to inspect the data packet content (e.g., throughput sequence number, source address) to discard any duplications. In some instances, the station 115-a may indicate to the relay AP 105-b the groups or memberships of the station 115-a so that the relay AP 105-b does not relay or retransmit packets to the station 115-a that are destined for devices in other groups.

When the station 115-a goes to a power save mode (e.g., a sleep mode), the station 115-a may wake up periodically to listen to beacon signals transmitted by the gateway AP 105-a over the communications link 220. The relay AP 105-b may also go into a power save mode (e.g., sleep mode) if there are no other stations to serve. The relay AP 105-b may wake up periodically to listen to beacon signals transmitted by the gateway AP 105-a over a long-range link with the relay AP 105-b when such a link exists. When the beacon signals include a TIM indicating that there is buffered data for the station 115-a, both the relay AP 105-b and the station 115-a may wake up to notify the gateway AP 105-a that they are ready to receive the data and start receiving the data.

The medium access resolution in the short-range, high-throughput link (e.g., communications links 230 and 235), may be at least partially performed in the long-range link (i.e., communications link 220) as well. For example, the nodes in the wireless relaying network of FIG. 2A may use the communications link 220 to send request-to-send (RTS) signals, clear-to-send (CTS) signals, and/or CTS-to-self signals to notify the other nodes about the medium access in the high-throughput link (e.g., communications links 230 and 235). The communications link 220 provides longer coverage and can greatly eliminate the potential hidden terminal situations that may arise in the communication links 230 and 235.

FIG. 2B shows a diagram 200-a that includes the gateway AP 105-a, the station 115-a, the relay AP 105-b, and the network 205 described above with respect to FIG. 2A. An additional communications link 240 between the gateway AP 105-a and the relay AP 105-b is shown that provides a long-range link for transmission of beacon signals from the gateway AP 105-a to the relay AP 105-b. The communications link 240 may also be used for traffic other than beacon signals. The communications link 240 may use the 2G band or the sub-1G band to provide longer range than the 5G band. Although not shown in FIG. 2B, both the gateway AP 105-a and the relay AP 105-b may include a radio that supports transmissions and/or receptions over the band (e.g., 2G band or the sub-1G band) used by the communications link 240. In some cases, the same radio may be used by the gateway AP 105-a to establish the communications link 220 with the station 115-a and the communications link 240 with the relay AP 105-b.

FIG. 2C shows a diagram 200-b that includes the gateway AP 105-a, the station 115-a, the relay AP 105-b (referred to as relay AP 1), and the network 205 described above with respect to FIGS. 2A and 2B. Also shown is another relay AP 105-c (referred to as relay AP 2), which may be an example of the relay AP 105-b. Diagram 200-b illustrates how one or more additional relay APs may be needed when the coverage provided by a single relay AP is not sufficient. In this example, the relay APs 1 and 2 may be used to provide indirect communication between the gateway AP 105-a and the station 115-a with short-range, high-throughput communications links 245, 250, and 255. The communications links 245, 250, and 255 may be examples of the communications links 230 and 235 of FIGS. 2A and 2B. The communications links 245, 250, and 255 may use the 5G band to provide higher throughput. In some instances, the communications links 245, 250, and 255 may use different channels within the 5G band to reduce interference. The relay APs 1 and 2 may include one or more radios to enable the communications links 245, 250, and 255.

Figure 3A:
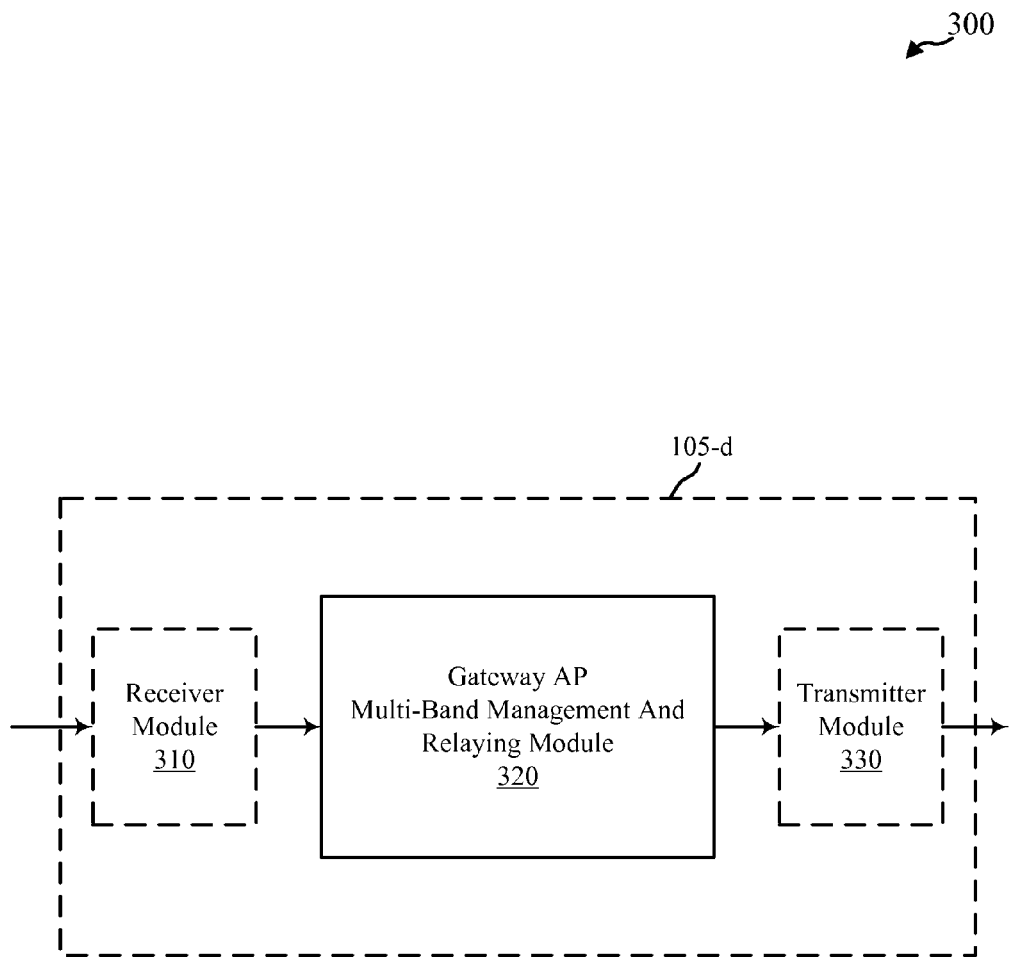
FIGS. 3A and 3B show diagrams that illustrate examples of devices, such as gateway APs, for use in wireless communications according to various embodiments.

FIG. 3A shows a block diagram 300 that illustrates a device 105-d for use in wireless communications in accordance with various embodiments. In some embodiments, the device 105-d may be an example of one or more aspects of one of the APs or gateway APs 105 described with reference to FIGS. 1, 2A, 2B, and/or 2C. The device 105-d may also be a processor. The device 105-d may include a receiver module 310, a gateway AP multi-band management and relaying module 320, and/or a transmitter module 330. Each of these components may be in communication with each other.

The components of the device 105-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 310 may be or include a radio frequency (RF) receiver, such as an RF receiver operable to receive transmissions in a sub-1G band, a 2G band, and/or a 5G band (or other Wi-Fi bands). The RF receiver may include separate receivers for the different bands. The receiver module 310 may be used to receive various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the transmitter module 330 may be or include an RF transmitter, such as an RF transmitter operable to transmit in a sub-1G band, a 2G band, and/or a 5G band (or other Wi-Fi bands). The RF transmitter may include separate transmitters for the different bands. The transmitter module 330 may be used to transmit various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the gateway AP multi-band management and relaying module 320 is configured to transmit a first type of traffic directly to a station (e.g., station 115-a), where beacon signals transmitted to the station are transmitted as part of the first type of traffic, and to transmit a second type of traffic to the station via at least one relay AP (e.g., relay AP 105-b). These transmissions may be made by having concurrent communication links with the station and the at least one relay AP.

In some embodiments of the gateway AP multi-band management and relaying module 320, transmitting the first type of traffic includes transmitting low-throughput traffic, and transmitting the second type of traffic includes transmitting high-throughput traffic. In some embodiments, transmitting the first type of traffic includes transmitting the first type of traffic over a long-range radio link, where the long-range radio link is a 2 GHz band link or a sub-1 GHz band link. In some embodiments, transmitting the second type of traffic includes transmitting the second type over at least one short-range radio link, where the at least one short-range radio link is a 5 GHz band link.

In some embodiments of the gateway AP multi-band management and relaying module 320, transmitting the first type of traffic includes transmitting one or more of low bursts of broadcast traffic, low bursts of multicast traffic, and low bursts of unicast traffic. In some embodiments, transmitting the second type of traffic includes transmitting one or more of high bursts of unicast data traffic, high bursts of broadcast data traffic, unicast traffic with low latency, and broadcast traffic with low latency.

In some embodiments, the gateway AP multi-band management and relaying module 320 is configured to receive low-throughput traffic directly from the station over a long-range radio link, and to receive high-throughput traffic from the station via the at least one relay AP and over at least one short-range radio link.

Figure 3B:
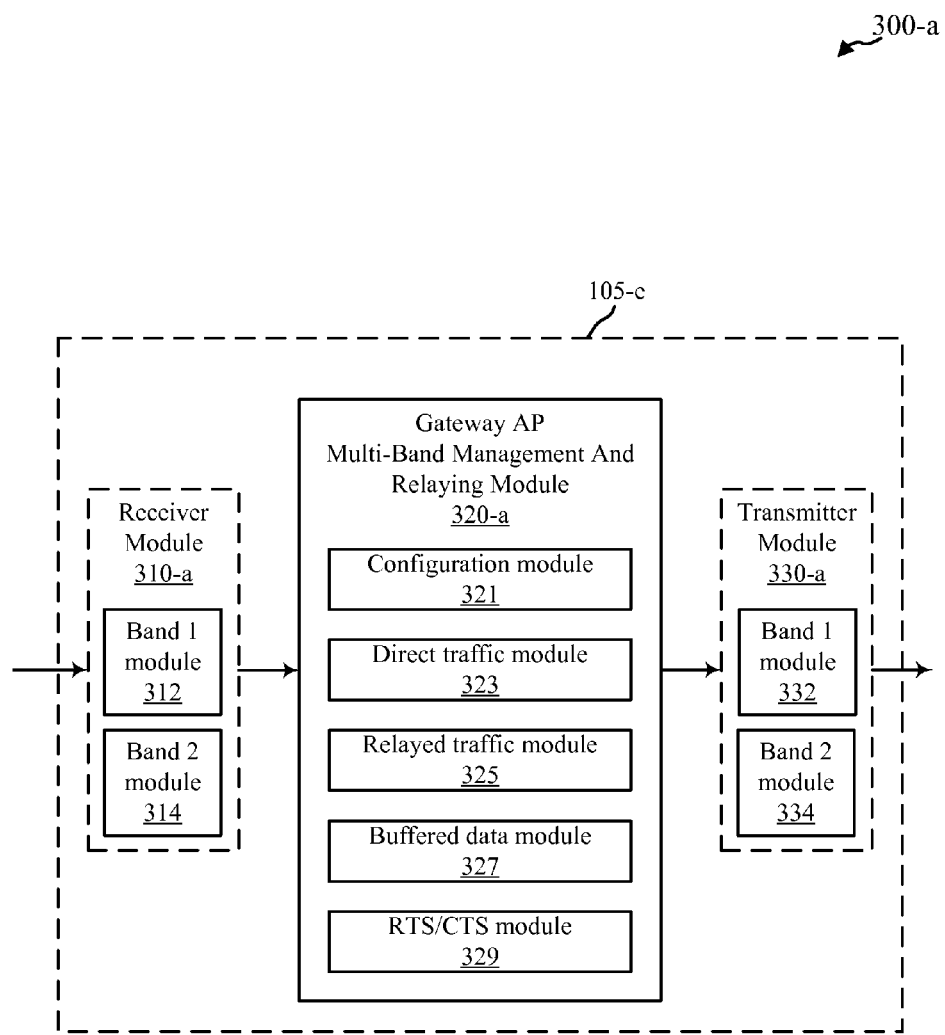

FIG. 3B shows a block diagram 300-a that illustrates a device 105-e for use in wireless communications in accordance with various embodiments. In some embodiments, the device 105-e may be an example of the device 105-d of FIG. 3A. The device 105-e may also be a processor. The device 105-e may include a receiver module 310-a, a gateway AP multi-band management and relaying module 320-a, and/or a transmitter module 330-a. Each of these components may be in communication with each other.

The components of the device 105-e may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 310-a may be an example of the receiver module 310 of FIG. 3A. The receiver module 310-a may include a band 1 module 312 and a band 2 module 314, which may be configured to receive transmissions in different bands from a sub-1G band, a 2G band, and a 5G band (or other Wi-Fi bands). The transmitter module 330-a may be an example of the transmitter module 330 of FIG. 3A. The transmitter module 310-a may include a band 1 module 332 and a band 2 module 334, which may be configured to transmit in different bands from a sub-1G band, a 2G band, and a 5G band (or other Wi-Fi bands).

The gateway AP multi-band management and relaying module 320-a may be an example of the gateway AP multi-band management and relaying module 320 of FIG. 3A, and may include a configuration module 321, a direct traffic module 323, a relayed traffic module 325, a buffered data module 327, and an RTS/CTS module 329. Each of these components may be in communication with each other.

The configuration module 321 may handle aspects described at least with respect to FIGS. 1, 2A, 2B, and/or 2C related to configuring parameters in the device 105-e for multi-band operation in wireless relaying networks and/or parameters that may be used by other devices for multi-band operation in wireless relaying networks. The direct traffic module 323 may handle aspects described at least with respect to FIGS. 1, 2A, 2B, and/or 2C related to direct communication with a station (e.g., station 115-a). The relayed traffic module 325 may handle aspects described at least with respect to FIGS. 1, 2A, 2B, and/or 2C related to indirect communication with a station (e.g., station 115-a) via at least one relay AP (e.g., relay AP 105-b). The buffered data module 327 may handle aspects described at least with respect to FIGS. 1, 2A, 2B, and/or 2C related to analyzing, identifying, and/or indicating buffered data for a station (e.g., station 115-a). The RTS/CTS module 329 may handle aspects described at least with respect to FIGS. 1, 2A, 2B, and/or 2C related to transmission of CTS signals, RTS signals, and/or CTS-to-self signals over a long-range link.

Figure 4A:
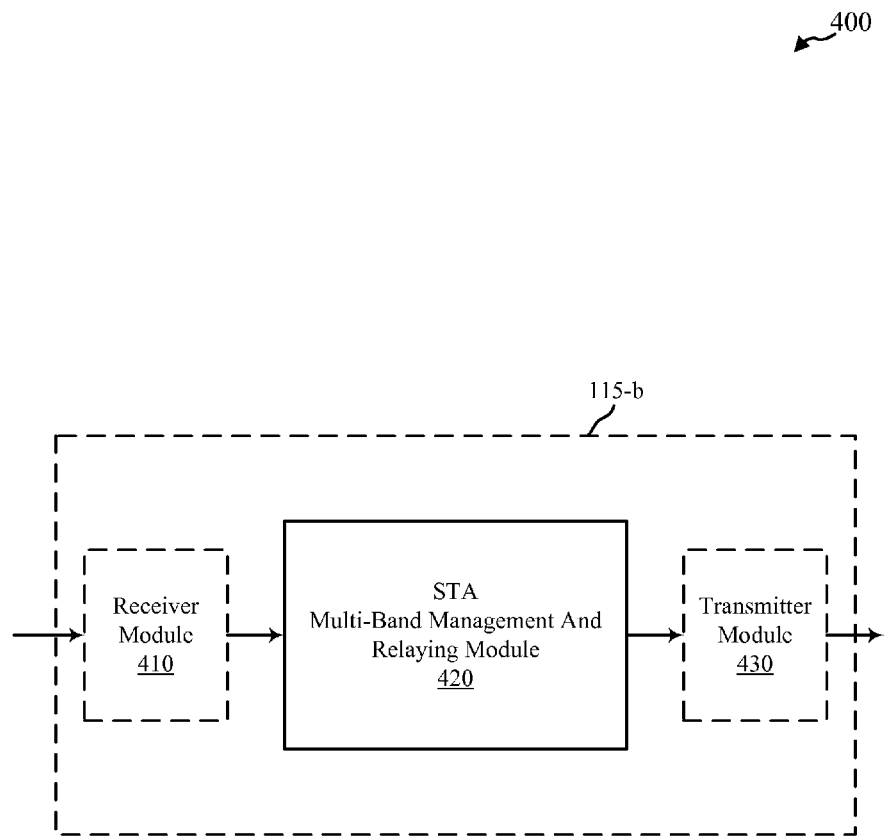
FIGS. 4A and 4B show diagrams that illustrate examples of devices, such as stations, for use in wireless communications according to various embodiments.

FIG. 4A shows a block diagram 400 that illustrates a device 115-b for use in wireless communications in accordance with various embodiments. In some embodiments, the device 115-b may be an example of one or more aspects of one of the stations 115 described with reference to FIGS. 1, 2A, 2B, and/or 2C. The device 115-b may also be a processor. The device 115-b may include a receiver module 410, an STA multi-band management and relaying module 420, and/or a transmitter module 430. Each of these components may be in communication with each other.

The components of the device 115-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 410 may be or include a radio frequency (RF) receiver, such as an RF receiver operable to receive transmissions in a sub-1G band, a 2G band, and/or a 5G band (or other Wi-Fi bands). The RF receiver may include separate receivers for the different bands. The receiver module 410 may be used to receive various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the transmitter module 430 may be or include an RF transmitter, such as an RF transmitter operable to transmit in a sub-1G band, a 2G band, and/or a 5G band (or other Wi-Fi bands). The RF transmitter may include separate transmitters for the different bands. The transmitter module 430 may be used to transmit various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the STA multi-band management and relaying module 420 is configured to receive a first type of traffic at a station (e.g., station 115-a) directly from a gateway AP (e.g., gateway AP 105-a), where beacon signals received by the station are received as part of the first type of traffic, and to receive a second type of traffic at the station from the gateway AP via at least one relay AP (e.g., relay AP 105-b). These receptions may be made by having concurrent communication links with the gateway AP and the at least one relay AP.

In some embodiments of the STA multi-band management and relaying module 420, receiving the first type of traffic includes receiving low-throughput traffic, and receiving the second type of traffic includes receiving high-throughput traffic. In some embodiments, receiving the first type of traffic includes receiving the first type of traffic over a long-range radio link, where the long-range radio link is a 2 GHz band link or a sub-1 GHz band link. In some embodiments, receiving the second type of traffic includes receiving the second type over at least one short-range radio link, where the at least one short-range radio link is a 5 GHz band link.

In some embodiments of the STA multi-band management and relaying module 420, receiving the first type of traffic includes receiving one or more of low bursts of broadcast traffic, low bursts of multicast traffic, and low bursts of unicast traffic. In some embodiments, receiving the second type of traffic includes receiving one or more of high bursts of unicast data traffic, high bursts of broadcast data traffic, unicast traffic with low latency, and broadcast traffic with low latency.

In some embodiments, the STA multi-band management and relaying module 420 is configured to transmit low-throughput traffic directly to the gateway AP over a long-range radio link, and to transmit high-throughput traffic from to the gateway AP via the at least one relay AP and over at least one short-range radio link.

Figure 4B:
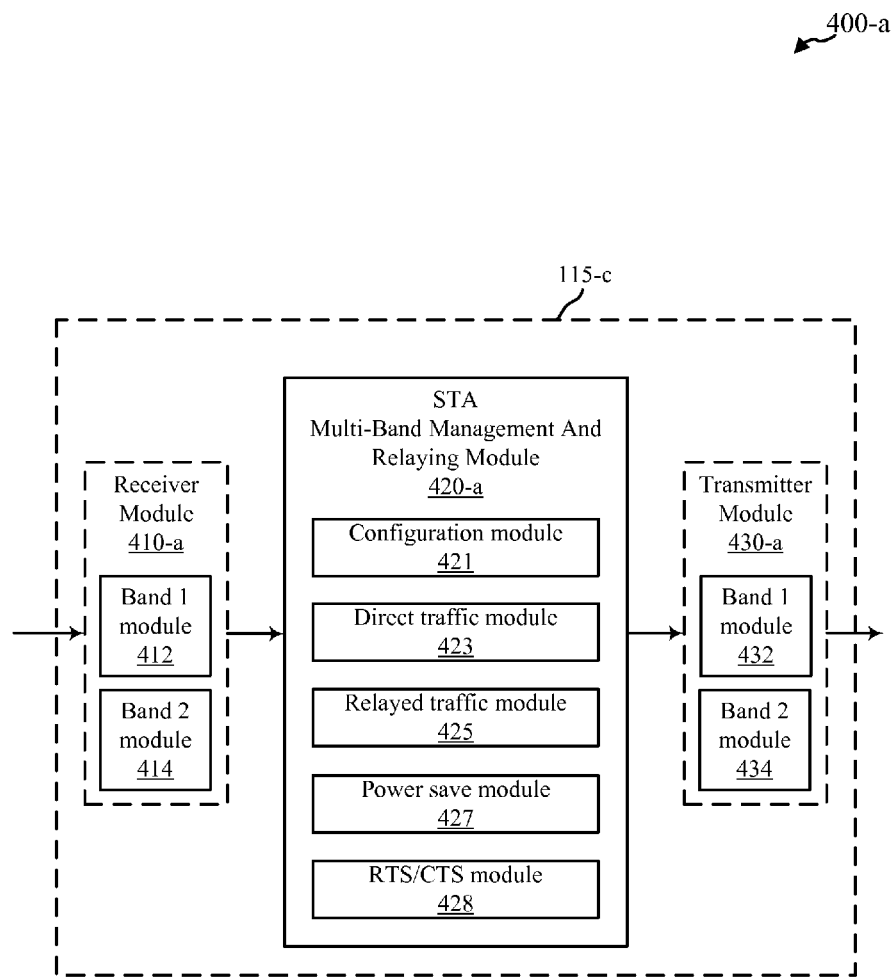

FIG. 4B shows a block diagram 400-a that illustrates a device 115-c for use in wireless communications in accordance with various embodiments. In some embodiments, the device 115-c may be an example of the device 115-b of FIG. 4A. The device 115-c may also be a processor. The device 115-c may include a receiver module 410-a, an STA multi-band management and relaying module 420-a, and/or a transmitter module 430-a. Each of these components may be in communication with each other.

The components of the device 115-c may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 410-a may be an example of the receiver module 410 of FIG. 4A. The receiver module 410-a may include a band 1 module 412 and a band 2 module 414, which may be configured to receive transmissions in different bands from a sub-1G band, a 2G band, and a 5G band (or other Wi-Fi bands). The transmitter module 430-a may be an example of the transmitter module 430 of FIG. 4A. The transmitter module 410-a may include a band 1 module 432 and a band 2 module 434, which may be configured to transmit in different bands from a sub-1G band, a 2G band, and a 5G band (or other Wi-Fi bands).

The STA multi-band management and relaying module 420-a may be an example of the STA multi-band management and relaying module 420 of FIG. 4A, and may include a configuration module 421, a direct traffic module 423, a relayed traffic module 425, a power save module 427, and an RTS/CTS module 429. Each of these components may be in communication with each other.

The configuration module 421 may handle aspects described at least with respect to FIGS. 1, 2A, 2B, and/or 2C related to configuring parameters in the device 115-c for multi-band operation in wireless relaying networks and/or parameters that may be used by other devices for multi-band operation in wireless relaying networks. The direct traffic module 423 may handle aspects described at least with respect to FIGS. 1, 2A, 2B, and/or 2C related to direct communication with a gateway AP (e.g., gateway AP 105-a). The relayed traffic module 425 may handle aspects described at least with respect to FIGS. 1, 2A, 2B, and/or 2C related to indirect communication with a gateway AP (e.g., gateway AP 105-a) via at least one relay AP (e.g., relay AP 105-b). The power save module 427 may handle aspects described at least with respect to FIGS. 1, 2A, 2B, and/or 2C related to a power save mode or a sleep mode in a station (e.g., station 115-a). The RTS/CTS module 429 may handle aspects described at least with respect to FIGS. 1, 2A, 2B, and/or 2C related to transmission of CTS signals, RTS signals, and/or CTS-to-self signals over a long-range link.

Figure 5A:
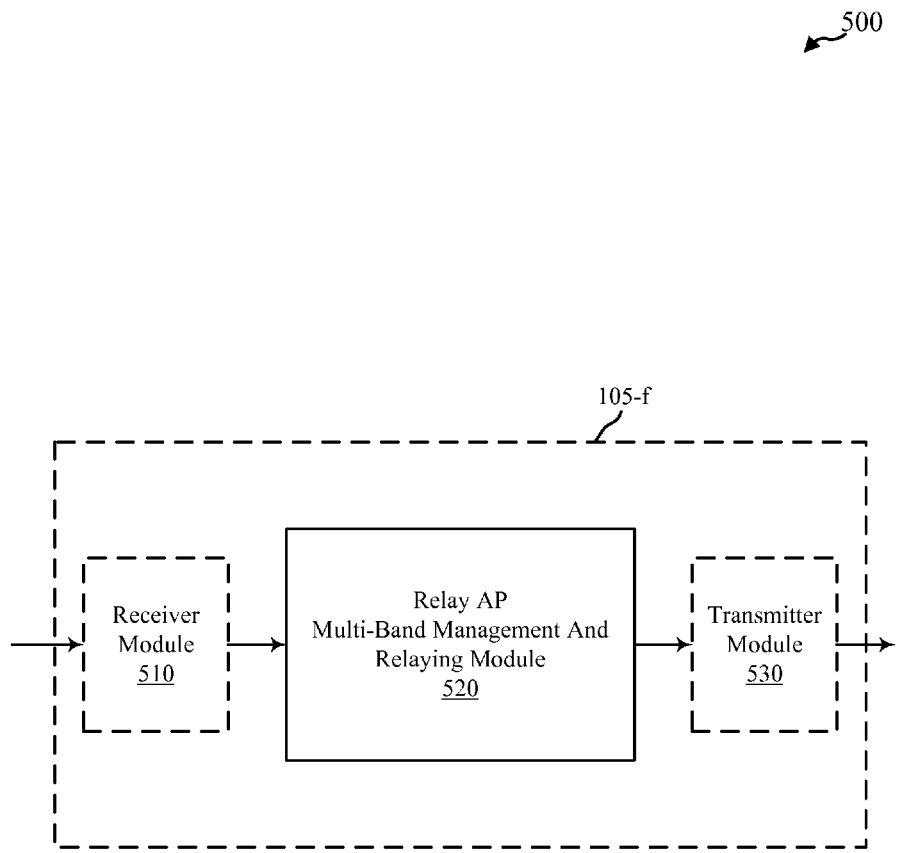
FIGS. 5A and 5B show diagrams that illustrate examples of devices, such as relay APs, for use in wireless communications according to various embodiments.

FIG. 5A shows a block diagram 500 that illustrates a device 105-f for use in wireless communications in accordance with various embodiments. In some embodiments, the device 105-f may be an example of one or more aspects of one of the relay APs described with reference to FIGS. 2A, 2B, and/or 2C. The device 105-f may also be a processor. The device 105-f may include a receiver module 510, a relay AP multi-band management and relaying module 520, and/or a transmitter module 530. Each of these components may be in communication with each other.

The components of the device 105-f may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 510 may be or include a radio frequency (RF) receiver, such as an RF receiver operable to receive transmissions in a 5G band (or some other Wi-Fi band used for short-range links). In some instances, the RF receiver may include multiple receivers. The receiver module 510 may be used to receive various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the transmitter module 530 may be or include an RF transmitter, such as an RF transmitter operable to transmit in a 5G band (or some other Wi-Fi band used for short-range links). In some instances, the RF transmitter may include multiple transmitters. The transmitter module 530 may be used to transmit various types of data and/or control signals (i.e., transmissions) over one or more communication links of a wireless communications system, such as one or more communication links of the WLAN or Wi-Fi networks described with reference to FIGS. 1, 2A, 2B, and/or 2C.

In some embodiments, the relay AP multi-band management and relaying module 520 is configured to perform various aspects described herein with respect to relaying traffic and/or other information from a gateway AP (e.g., gateway AP 105-b) to a station (e.g., station 115-a) in a WLAN or Wi-Fi network, such as the networks of FIGS. 1, 2A, 2B, and/or 2C, for example.

Figure 5B:
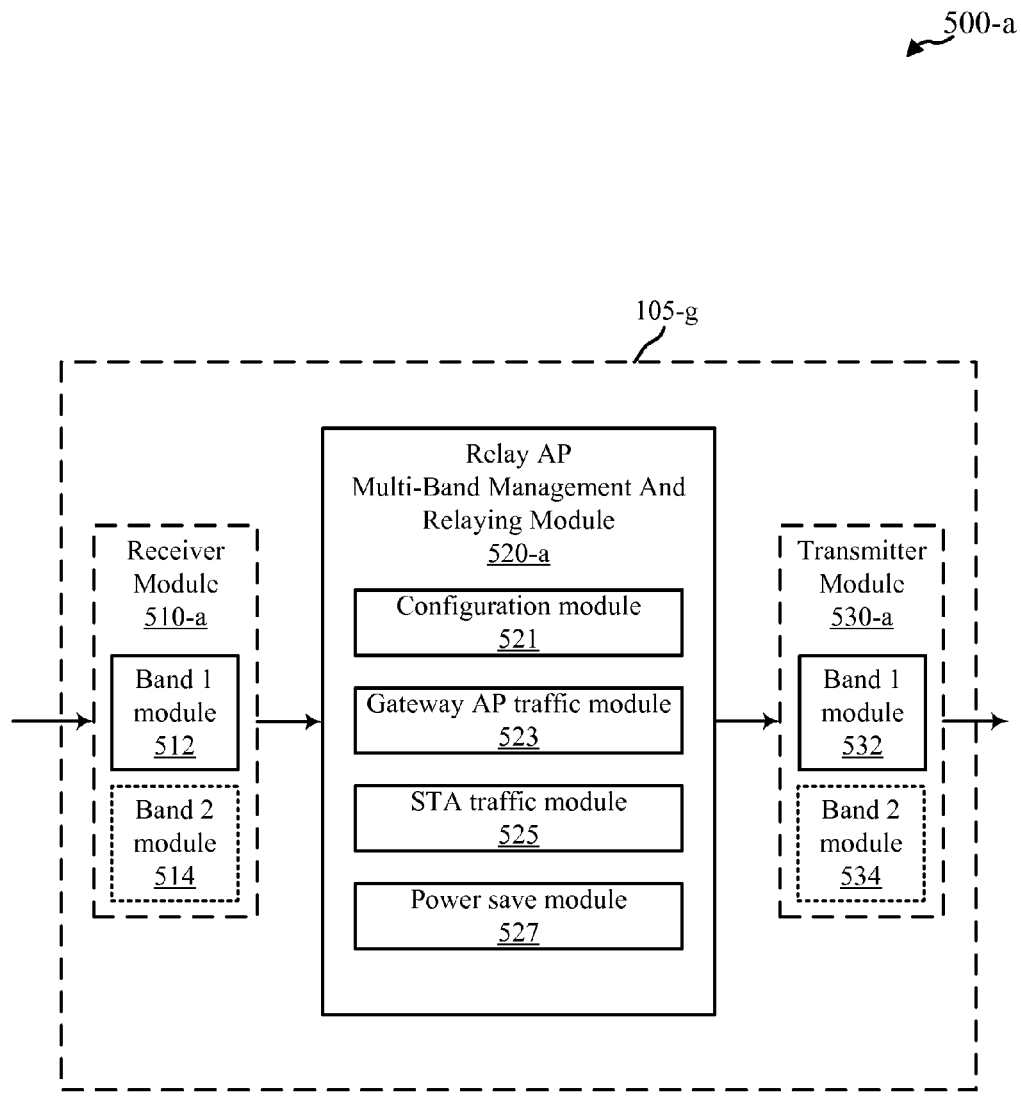

FIG. 5B shows a block diagram 500-a that illustrates a device 105-g for use in wireless communications in accordance with various embodiments. In some embodiments, the device 105-g may be an example of the device 105-f of FIG. 5A. The device 105-g may also be a processor. The device 105-g may include a receiver module 510-a, a relay AP multi-band management and relaying module 520-a, and/or a transmitter module 530-a. Each of these components may be in communication with each other.

The components of the device 105-g may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 510-a may be an example of the receiver module 510 of FIG. 5A. The receiver module 510-a may include a band 1 module 512 and optionally a band 2 module 514, which may be configured to receive transmissions in different bands from a sub-1G band, a 2G band, and a 5G band (or other Wi-Fi bands). The band 2 module 514 may be used when a relay AP has its own long-range link for communicating with a gateway AP.

The transmitter module 530-a may be an example of the transmitter module 530 of FIG. 5A. The transmitter module 510-a may include a band 1 module 532 and optionally a band 2 module 534, which may be configured to transmit in different bands from a sub-1G band, a 2G band, and a 5G band (or other Wi-Fi bands). The band 2 module 534 may be used when a relay AP has its own long-range link for communicating with a gateway AP.

The relay AP multi-band management and relaying module 520-a may be an example of the relay AP multi-band management and relaying module 520 of FIG. 5A, and may include a configuration module 521, a gateway AP traffic module 523, a station (STA) traffic module 525, and a power save module 527. Each of these components may be in communication with each other.

The configuration module 521 may handle aspects described at least with respect to FIGS. 1, 2A, 2B, and/or 2C related to configuring parameters in the device 105-g for multi-band operation in wireless relaying networks and/or parameters that may be used by other devices for multi-band operation in wireless relaying networks. The gateway AP traffic module 523 may handle aspects described at least with respect to FIGS. 1, 2A, 2B, and/or 2C related to communication between a relay AP (e.g., relay AP 105-b) and a gateway AP (e.g., gateway AP 105-a). The STA traffic module 525 may handle aspects described at least with respect to FIGS. 1, 2A, 2B, and/or 2C related to communication between a relay AP (e.g., relay AP 105-b) and a station (e.g., station 115-a). The power save module 527 may handle aspects described at least with respect to FIGS. 1, 2A, 2B, and/or 2C related to a power save mode or a sleep mode in a relay AP (e.g., relay AP 105-b).

Figure 6:
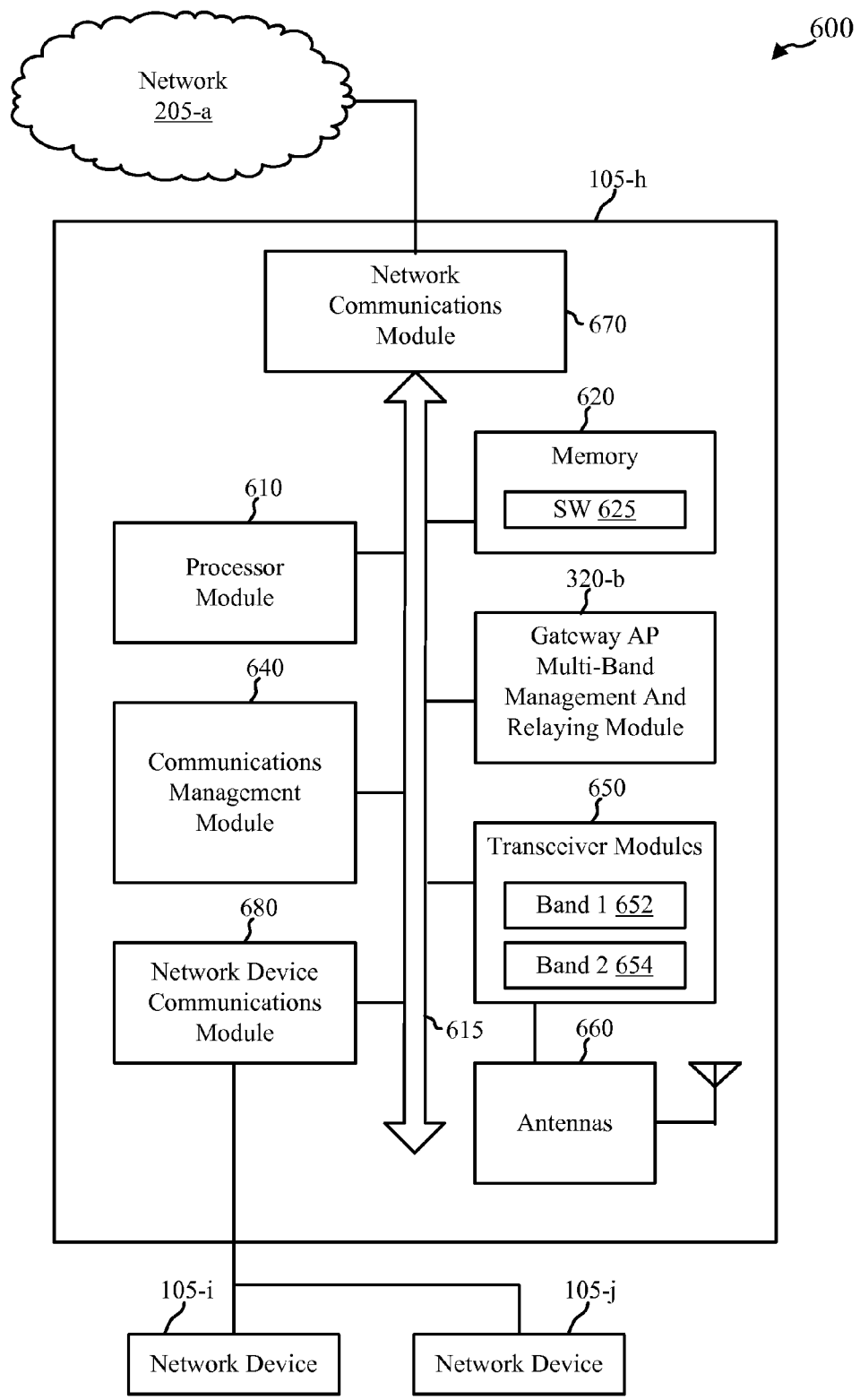
FIG. 6 shows a block diagram that illustrates an example of a gateway AP architecture according to various embodiments.

FIG. 6 shows a diagram 600 that illustrates a gateway AP 105-h configured for wireless communications, and more particularly, for use in multi-band management of wireless relaying networks. In some embodiments, the gateway AP 105-h may be an example of one or more of the gateway APs or devices 105 described with reference to FIGS. 1, 2A, 2B, 2C, 3A, and/or 3B. The gateway AP 105-h may be configured to implement at least some of the features and functions described above with respect to FIGS. 1, 2A, 2B, 2C, 3A, and/or 3B. The gateway AP 105-h may include a processor module 610, a memory module 620, at least one transceiver module (represented by transceiver module(s) 650), at least one antenna (represented by antenna(s) 660), and a gateway AP multi-band management and relaying module 320-b. The gateway AP multi-band management and relaying module 320-b may be an example of the gateway AP multi-band management and relaying modules 320 and 320-a of FIGS. 3A and 3B, respectively. The gateway AP 105-h may also include one or both of a network device communications module 680 and a network communications module 670. Each of these components may be in communication with each other, directly or indirectly, over one or more buses 615.

The memory module 620 may include RAM and ROM. The memory module 620 may also store computer-readable, computer-executable software (SW) code 625 containing instructions that are configured to, when executed, cause the processor module 610 to perform various functions described herein for multi-band management of wireless relaying networks in a gateway AP. Alternatively, the software code 625 may not be directly executable by the processor module 610 but be configured to cause the gateway AP 105-*h*, e.g., when compiled and executed, to perform various of the functions described herein.

The processor module 610 may include an intelligent hardware device, e.g., a CPU, a microcontroller, an ASIC, etc. The processor module 610 may process information received through the transceiver module(s) 650, the network device communications module 680, and/or the network communications module 670. The processor module 610 may also process information to be sent to the transceiver module(s) 650 for transmission through the antenna(s) 660, to the network device communications module 680 for transmission to one or more other network devices 105-*i* and 105-*j*, and/or to the network communications module 670 for transmission to a network 205-*a*, which may be an example of the network 205 of FIGS. 2A-2C. The processor module 610 may handle, alone or in connection with the gateway AP multi-band management and relaying module 320-*b*, various aspects for multi-band management of wireless relaying networks in a gateway AP.

The transceiver module(s) 650 may include a modem configured to modulate the packets and provide the modulated packets to the antenna(s) 660 for transmission, and to demodulate packets received from the antenna(s) 660. The transceiver module(s) 650 may be implemented as one or more transmitter modules and one or more separate receiver modules. The transceiver module(s) 650 may include a band 1 module 652 and a band 2 module 654, which may be configured for transmission/reception at different bands from a sub-1G band, a 2G band, and a 5G band (or other Wi-Fi bands). The transceiver module(s) 650 may be configured to communicate bi-directionally, via the antennas 660, with one or more of the stations or devices 115 described with reference to FIGS. 1, 2A, 2B, 2C, 4A, and/or 4B, for example, and/or with one or more of the relay APs or devices 105 described with reference to FIGS. 2A, 2B, 2C, 5A, and/or 5B. The gateway AP 105-*h* may typically include multiple antennas 660 (e.g., an antenna array).

According to the architecture of FIG. 6, the gateway AP 105-*h* may further include a communications management module 640. The communications management module 640 may manage communications with other APs and/or devices. The communications management module 640 may be in communication with some or all of the other components of the gateway AP 105-*h* via the bus or buses 615. Alternatively, functionality of the communications management module 640 may be implemented as a component of the transceiver module(s) 650, as a computer program product, and/or as one or more controller elements of the processor module 610.

The gateway AP multi-band management and relaying module 320-*b* may be configured to perform and/or control some or all of the functions or aspects described with reference to FIGS. 1-5B related to using a gateway AP with concurrent communications over multiple bands in wireless relaying networks. The gateway AP multi-band management and relaying module 320-*b*, or portions of it, may include a processor. Moreover, some or all of the functionality of the gateway AP multi-band management and relaying module 320-*b* may be performed by the processor module 610 and/or in connection with the processor module 610.

Figure 7:
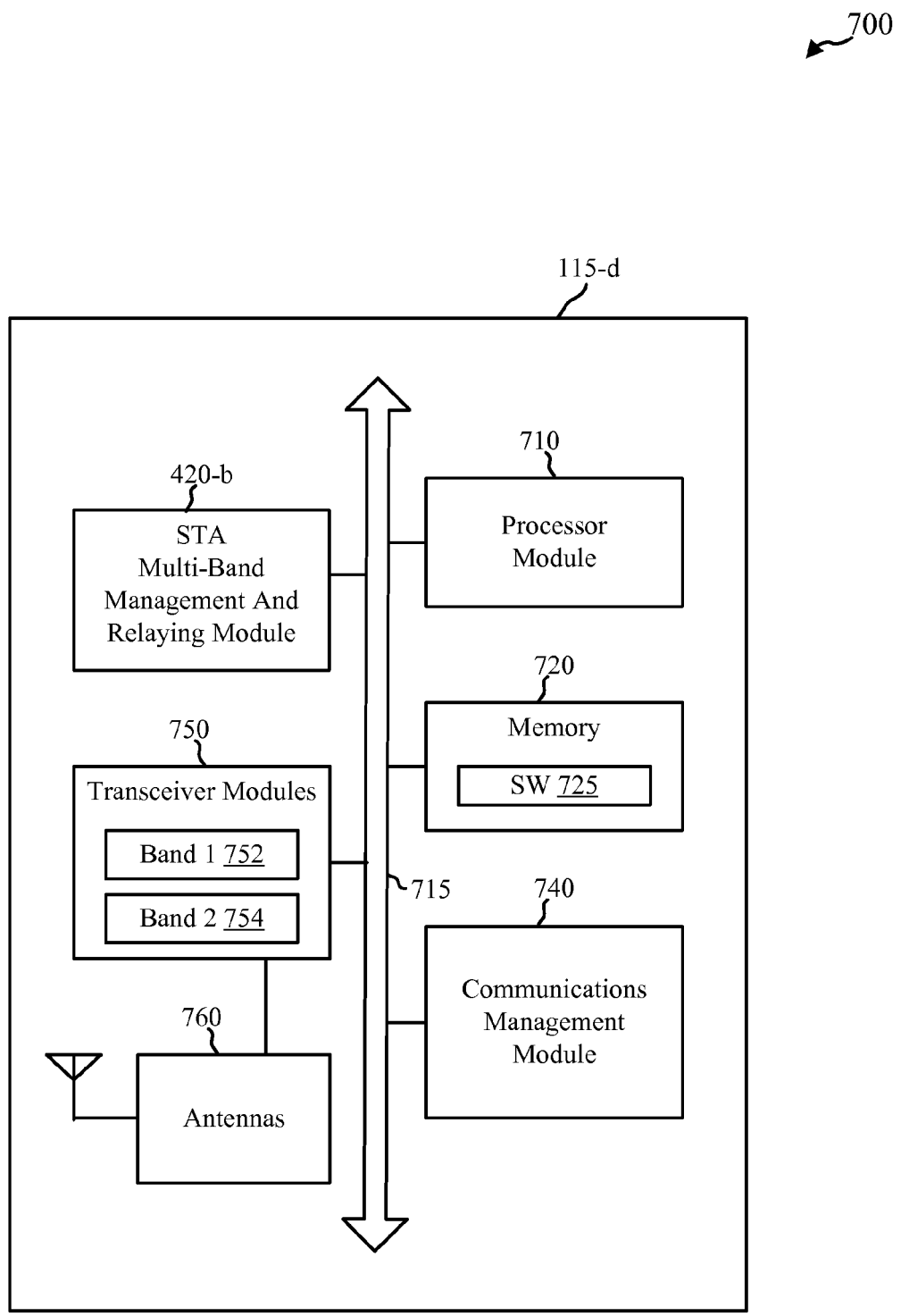
FIG. 7 shows a block diagram that illustrates an example of a station architecture according to various embodiments.

FIG. 7 shows a diagram 700 that illustrates a station 115-*d* configured for wireless communications, and more particularly, for use in multi-band management of wireless relaying networks. In some embodiments, the station 115-*d* may be an example of one or more of the stations or devices 105 described with reference to FIGS. 1, 2A, 2B, 2C, 4A, and/or 4B. The station 115-*d* may be configured to implement at least some of the features and functions described above with respect to FIGS. 1, 2A, 2B, 2C, 4A, and/or 4B. The station 115-*d* may include a processor module 710, a memory module 720, at least one transceiver module (represented by transceiver module(s) 750), at least one antenna (represented by antenna(s) 760), and an STA multi-band management and relaying module 420-*b*. The STA multi-band management and relaying module 420-*b* may be an example of the STA multi-band management and relaying modules 420 and 420-*a* of FIGS. 4A and 4B, respectively. Each of these components may be in communication with each other, directly or indirectly, over one or more buses 715.

The memory module 720 may include RAM and ROM. The memory module 720 may also store computer-readable, computer-executable software (SW) code 725 containing instructions that are configured to, when executed, cause the processor module 710 to perform various functions described herein for multi-band management of wireless relaying networks in a station. Alternatively, the software code 725 may not be directly executable by the processor module 710 but be configured to cause the station 115-*d*, e.g., when compiled and executed, to perform various of the functions described herein.

The processor module 710 may include an intelligent hardware device, e.g., a CPU, a microcontroller, an ASIC, etc. The processor module 710 may process information received through the transceiver module(s) 750. The processor module 710 may also process information to be sent to the transceiver module(s) 750 for transmission through the antenna(s) 760. The processor module 710 may handle, alone or in connection with the STA multi-band management and relaying module 420-*b*, various aspects for multi-band management of wireless relaying networks in a station.

The transceiver module(s) 750 may include a modem configured to modulate the packets and provide the modulated packets to the antenna(s) 760 for transmission, and to demodulate packets received from the antenna(s) 760. The transceiver module(s) 750 may be implemented as one or more transmitter modules and one or more separate receiver modules. The transceiver module(s) 750 may include a band 1 module 752 and a band 2 module 754, which may be configured for transmission/reception at different bands from a sub-1G band, a 2G band, and a 5G band (or other Wi-Fi bands). The transceiver module(s) 750 may be configured to communicate bi-directionally, via the antennas 760, with one or more of the APs or devices 105 described with reference to FIGS. 1, 2A, 2B, 2C, 3A, 3B, 5A and/or 5B. The station 115-*d* may typically include multiple antennas 760 (e.g., an antenna array).

According to the architecture of FIG. 7, the station 115-*d* may further include a communications management module 740. The communications management module 740 may manage communications with APs, including gateway APs and/or relay APs. The communications management module 740 may be in communication with some or all of the other components of the station 115-*d* via the bus or buses 715. Alternatively, functionality of the communications management module 740 may be implemented as a component of the transceiver module(s) 750, as a computer program product, and/or as one or more controller elements of the processor module 710.

The STA multi-band management and relaying module 420-b may be configured to perform and/or control some or all of the functions or aspects described with reference to FIGS. 1-5B related to using a station with concurrent communications over multiple bands in wireless relaying networks. The STA multi-band management and relaying module 420-b, or portions of it, may include a processor. Moreover, some or all of the functionality of the STA multi-band management and relaying module 420-b may be performed by the processor module 710 and/or in connection with the processor module 710.

Figure 8:
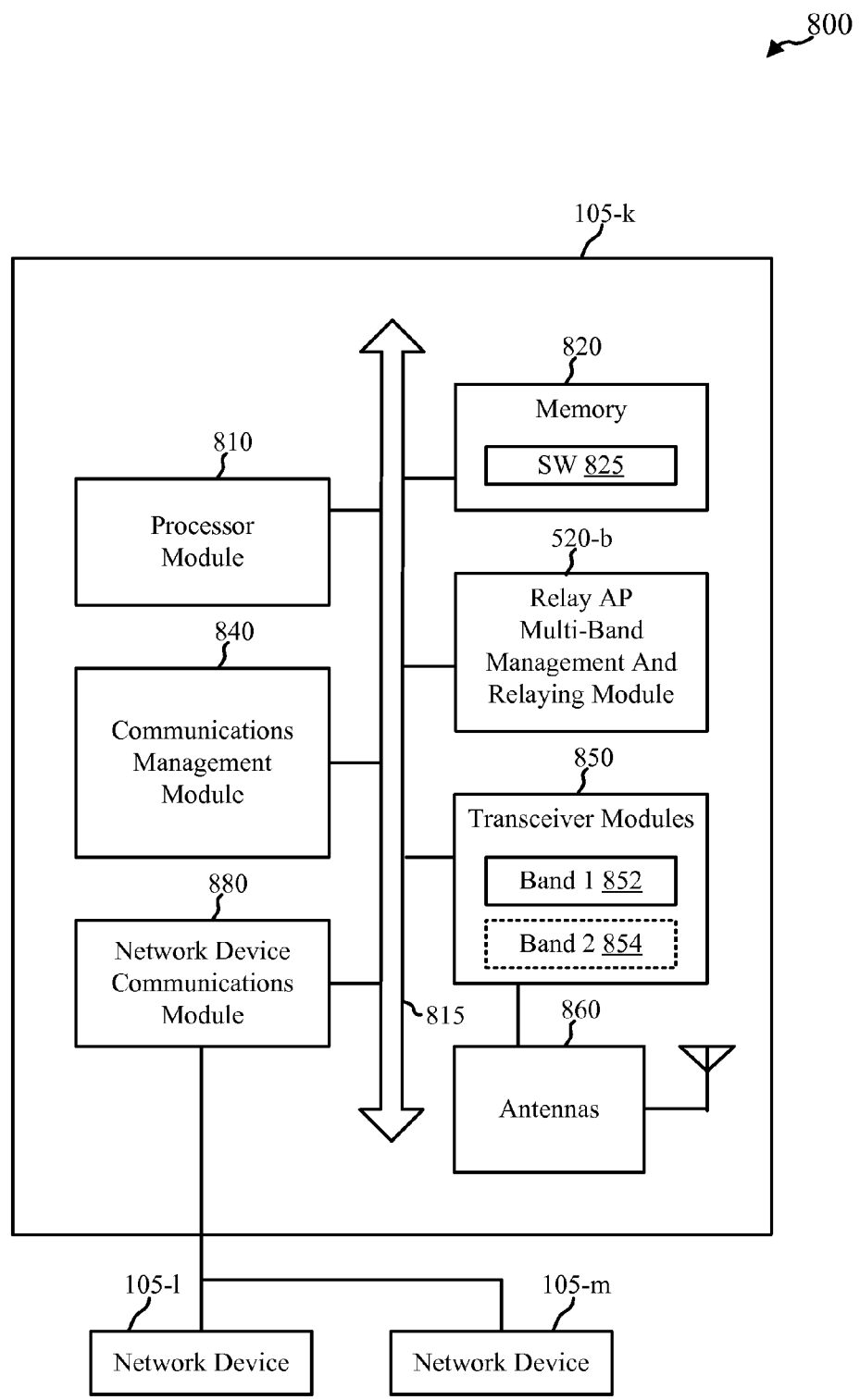
FIG. 8 shows a block diagram that illustrates an example of a relay AP architecture according to various embodiments.

FIG. 8 shows a diagram 800 that illustrates a relay AP 105-k configured for wireless communications, and more particularly, for use in multi-band management of wireless relaying networks. In some embodiments, the relay AP 105-k may be an example of one or more of the APs or devices 105 described with reference to FIGS. 1, 2A, 2B, 2C, 3A, 3B, 5A, and/or 5B. In other embodiments, the relay AP 105-k may be an example of one or more of the stations or devices 115 described with reference to FIGS. 1, 2A, 2B, 2C, 4A, and/or 4B, which are also configured to provide relaying functionality. The relay AP 105-k may be configured to implement at least some of the features and functions described above with respect to FIGS. 1, 2A, 2B, 2C, 5A, and/or 5B. The relay AP 105-k may include a processor module 810, a memory module 820, at least one transceiver module (represented by transceiver module(s) 850), at least one antenna (represented by antenna(s) 860), and a relay AP multi-band management and relaying module 520-b. The relay AP multi-band management and relaying module 520-b may be an example of the relay AP multi-band management and relaying modules 520 and 520-a of FIGS. 5A and 5B, respectively. The relay AP 105-k may also include a network device communications module 880. Each of these components may be in communication with each other, directly or indirectly, over one or more buses 815.

The memory module 820 may include RAM and ROM. The memory module 820 may also store computer-readable, computer-executable software (SW) code 825 containing instructions that are configured to, when executed, cause the processor module 810 to perform various functions described herein for multi-band management of wireless relaying networks in a relay AP. Alternatively, the software code 825 may not be directly executable by the processor module 810 but be configured to cause the relay AP 105-k, e.g., when compiled and executed, to perform various of the functions described herein.

The processor module 810 may include an intelligent hardware device, e.g., a CPU, a microcontroller, an ASIC, etc. The processor module 810 may process information received through the transceiver module(s) 850 an/or the network device communications module 880. The processor module 810 may also process information to be sent to the transceiver module(s) 850 for transmission through the antenna(s) 860 and/or to the network device communications module 880 for transmission to one or more other network devices 105-l and 105-m. The processor module 810 may handle, alone or in connection with the relay AP multi-band management and relaying module 520-b, various aspects for multi-band management of wireless relaying networks in a relay AP.

The transceiver module(s) 850 may include a modem configured to modulate the packets and provide the modulated packets to the antenna(s) 860 for transmission, and to demodulate packets received from the antenna(s) 860. The transceiver module(s) 850 may be implemented as one or more transmitter modules and one or more separate receiver modules. The transceiver module(s) 850 may include a band 1 module 852 and optionally a band 2 module 854, which may be configured for transmission/reception at different bands from a sub-1G band, a 2G band, and a 5G band (or other Wi-Fi bands). The band 2 module 854 may be used when the relay AP 105-k has its own long-range link for communicating with a gateway AP. The transceiver module(s) 850 may be configured to communicate bi-directionally, via the antennas 860, with one or more of the stations or devices 115 described with reference to FIGS. 1, 2A, 2B, 2C, 4A, and/or 4B, for example, and/or with one or more of the gateway APs or devices 105 described with reference to FIGS. 1, 2A, 2B, 2C, 3A, and/or 3B. The relay AP 105-k may typically include multiple antennas 660 (e.g., an antenna array).

According to the architecture of FIG. 7, the relay AP 105-k may further include a communications management module 840. The communications management module 840 may manage communications with other APs and/or devices. The communications management module 840 may be in communication with some or all of the other components of the relay AP 105-k via the bus or buses 815. Alternatively, functionality of the communications management module 840 may be implemented as a component of the transceiver module(s) 850, as a computer program product, and/or as one or more controller elements of the processor module 810.

The relay AP multi-band management and relaying module 520-b may be configured to perform and/or control some or all of the functions or aspects described with reference to FIGS. 1-5B related to using a relay AP with concurrent communications in wireless relaying networks. The relay AP multi-band management and relaying module 520-b, or portions of it, may include a processor. Moreover, some or all of the functionality of the relay AP multi-band management and relaying module 520-b may be performed by the processor module 510 and/or in connection with the processor module 510.

Figure 9:
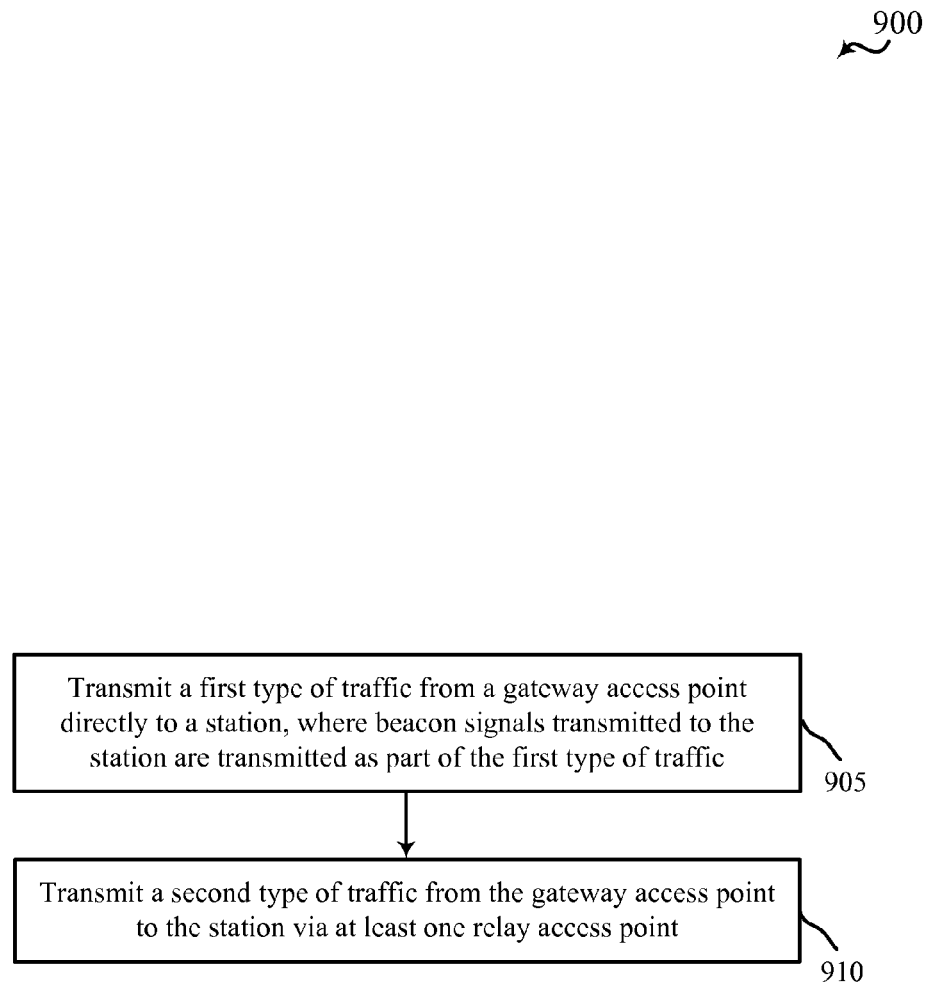
FIGS. 9-11 are flowcharts of examples of methods for multi-band management of wireless relaying networks (e.g., at a gateway AP) according to various embodiments.

FIG. 9 is a flow chart illustrating an example of a method 900 for wireless communications. For clarity, the method 900 is described below with reference to one of the APs, stations, and devices shown in FIGS. 1, 2A, 2B, 2C, 3A, 3B, 4A, 4B, 5A, 5B, 6, 7, and/or 8. In one embodiment, one of the gateways APs may execute one or more sets of codes to control the functional elements of the gateway AP to perform the functions described below.

At block 905, a first type of traffic may be transmitted from a gateway AP (e.g., gateway AP 105-a) directly to a station (e.g., station 115-a), where beacon signals transmitted to the station are transmitted as part of the first type of traffic.

At block 910, a second type of traffic may be transmitted from the gateway AP to the station via at least one relay AP (e.g., relay AP 105-b).

In some embodiments of the method 900, transmitting the first type of traffic includes transmitting low-throughput traffic and transmitting the second type of traffic includes transmitting high-throughput traffic. In some embodiments, transmitting the first type of traffic includes transmitting the first type of traffic over a long-range radio link. The long-range radio link may be a 2 GHz band link or a sub-1 GHz band link. In some embodiments, transmitting the second type of traffic includes transmitting the second type of traffic over at least one short-range radio link. The at least one short-range radio link may be a 5 GHz band link.

In some embodiments of the method 900, transmitting the first type of traffic includes transmitting one or more of low bursts of broadcast traffic, low bursts of multicast traffic, and low bursts of unicast traffic. In some embodiments, transmitting the second type of traffic includes transmitting one or more of high bursts of unicast data traffic, high bursts of broadcast data traffic, unicast traffic with low latency, and broadcast traffic with low latency.

In some embodiments of the method 900, the method includes receiving low-throughput traffic at the gateway AP directly from the station over a long-range radio link, and receiving high-throughput traffic at the gateway AP from the station via the at least one relay AP and over at least one short-range radio link.

Thus, the method 900 may provide for wireless communications. It should be noted that the method 900 is just one implementation and that the operations of the method 900 may be rearranged or otherwise modified such that other implementations are possible.

Figure 10:
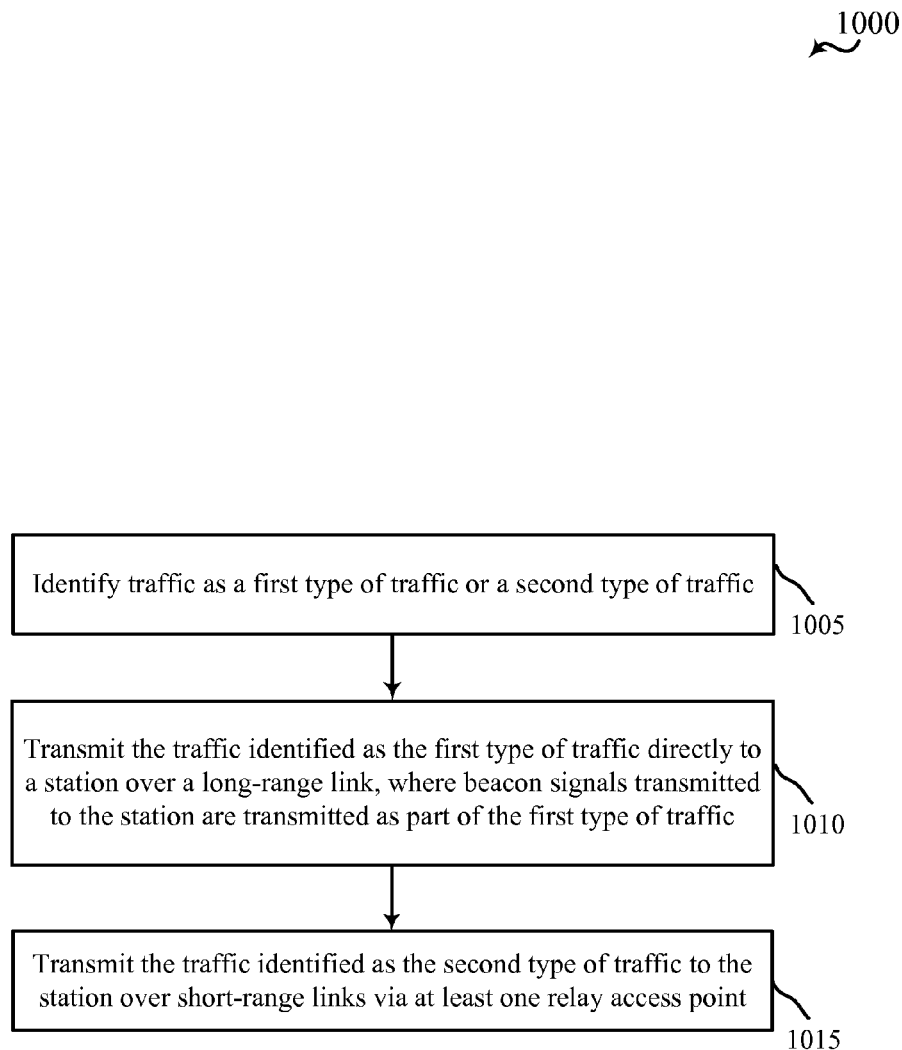

FIG. 10 is a flow chart illustrating an example of a method 1000 for wireless communications. For clarity, the method 1000 is described below with reference to one of the APs, stations, and devices shown in FIGS. 1, 2A, 2B, 2C, 3A, 3B, 4A, 4B, 5A, 5B, 6, 7, and/or 8. In one embodiment, one of the gateways APs may execute one or more sets of codes to control the functional elements of the gateway AP to perform the functions described below.

At block 1005, traffic may be identified as a first type of traffic or a second type of traffic.

At block 1010, the traffic identified as the first type of traffic may be transmitted directly to a station (e.g., station 115-a) over a long-range link (e.g., communications link 220), where beacon signals transmitted to the station are transmitted as part of the first type of traffic.

At block 1015, the traffic identified as the second type of traffic may be transmitted to the station over short-range links (e.g., communications link 230, 235) via at least one relay AP (e.g., relay AP 105-b).

Thus, the method 1000 may provide for wireless communications. It should be noted that the method 1000 is just one implementation and that the operations of the method 1000 may be rearranged or otherwise modified such that other implementations are possible.

Figure 11:
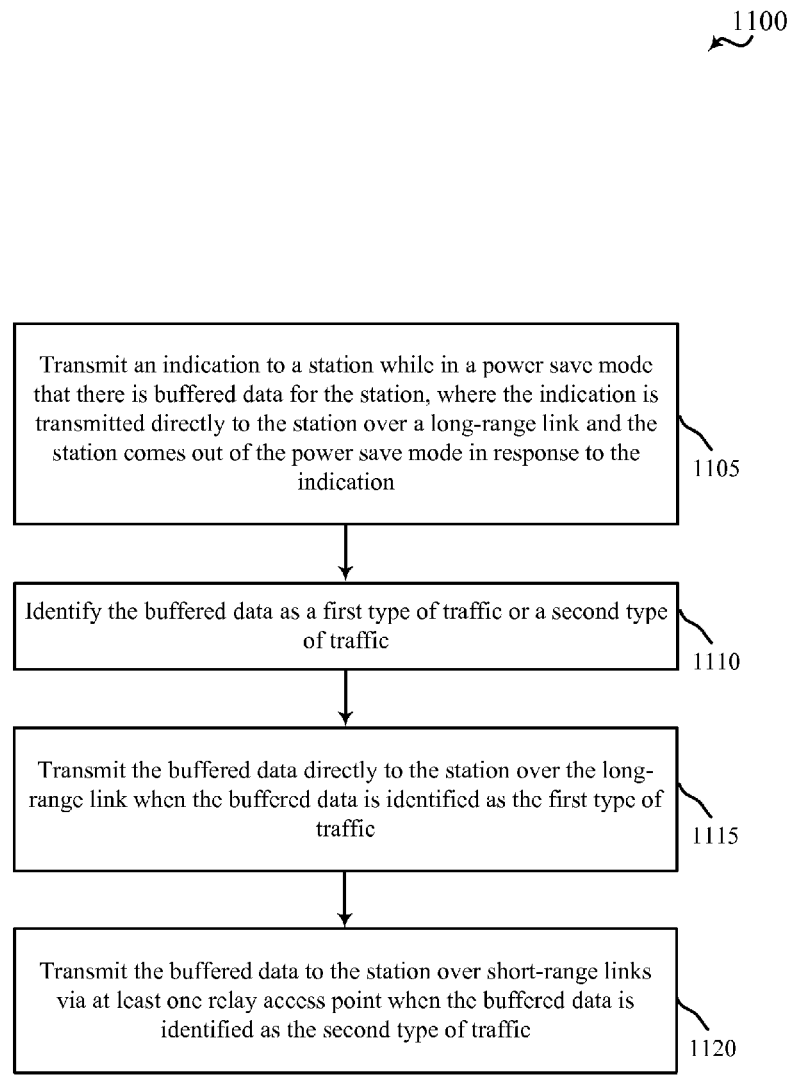

FIG. 11 is a flow chart illustrating an example of a method 1100 for wireless communications. For clarity, the method 1100 is described below with reference to one of the APs, stations, and devices shown in FIGS. 1, 2A, 2B, 2C, 3A, 3B, 4A, 4B, 5A, 5B, 6, 7, and/or 8. In one embodiment, one of the gateways APs may execute one or more sets of codes to control the functional elements of the gateway AP to perform the functions described below.

At block 1105, an indication may be transmitted to a station (e.g., station 115-a) while in a power save mode that there is buffered data for the station, where the indication (e.g., TIM) is transmitted directly to the station over a long-range link (e.g., communications link 220) and the station comes out of the power save mode in response to the indication.

At block 1110, the buffered data may be identified as a first type of data or a second type of data.

At block 1115, the buffered data may be transmitted directly to the station over the long-range link when the buffered data is identified as the first type of traffic.

At block 1120, the buffered data may be transmitted to the station over short-range links via at least one relay AP (e.g., relay AP 105-b) when the buffered data is identified as the second type of traffic.

Thus, the method 1100 may provide for wireless communications. It should be noted that the method 1100 is just one implementation and that the operations of the method 1100 may be rearranged or otherwise modified such that other implementations are possible.

Figure 12:
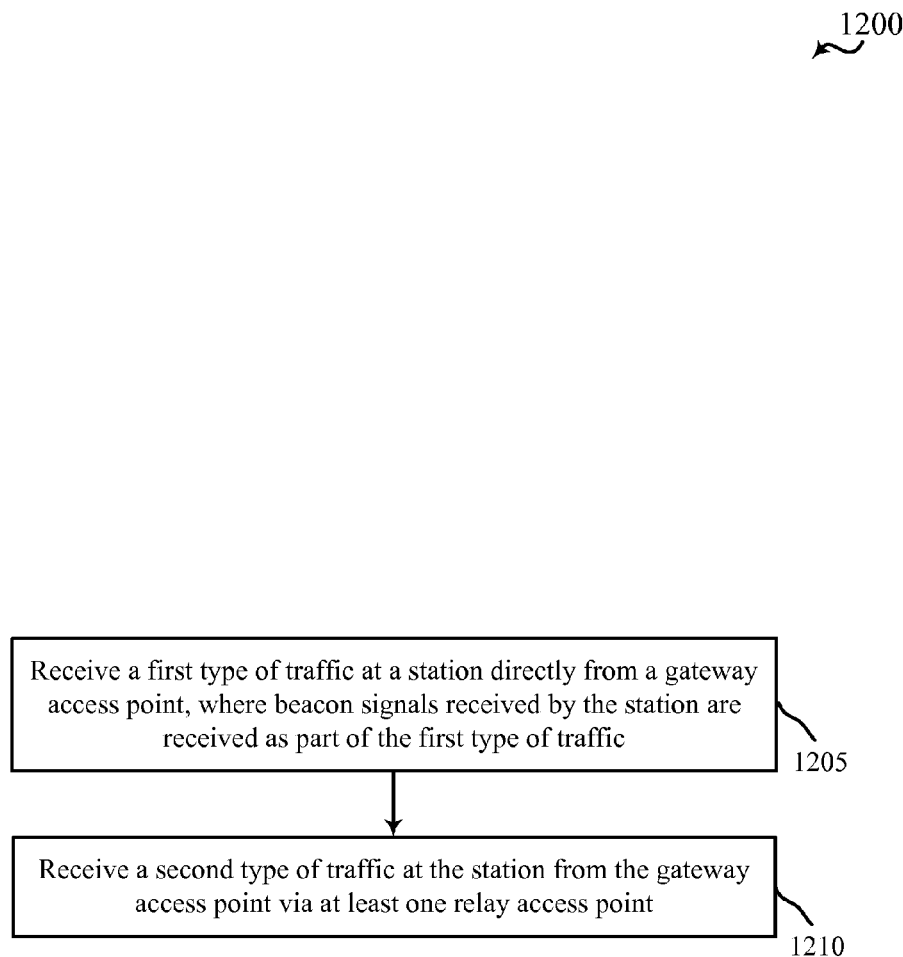
FIGS. 12-14 are flowcharts of examples of methods for multi-band management of wireless relaying networks (e.g., at a station) according to various embodiments.

FIG. 12 is a flow chart illustrating an example of a method 1200 for wireless communications. For clarity, the method 1200 is described below with reference to one of the APs, stations, and devices shown in FIG. 1, 2A, 2B, 2C, 3A, 3B, 4A, 4B, 5A, 5B, 6, 7, and/or 8. In one embodiment, one of the stations may execute one or more sets of codes to control the functional elements of the stations to perform the functions described below.

At block 1205, a first type of traffic may be received at a station (e.g., station 115-a) directly from a gateway AP (e.g., gateway AP 105-a), where beacon signals received by the station are received as part of the first type of traffic.

At block 1210, a second type of traffic may be received at the station from the gateway AP via at least one relay AP (e.g., relay AP 105-b).

In some embodiments of the method 1200, receiving the first type of traffic includes receiving low-throughput traffic and receiving the second type of traffic includes receiving high-throughput traffic. In some embodiments, receiving the first type of traffic includes receiving the first type of traffic over a long-range radio link. The long-range radio link may be a 2 GHz band link or a sub-1 GHz band link. In some embodiments, receiving the second type of traffic includes receiving the second type of traffic over at least one short-range radio link. The at least one short-range radio link may be a 5 GHz band link.

In some embodiments of the method 1200, receiving the first type of traffic includes receiving one or more of low bursts of broadcast traffic, low bursts of multicast traffic, and low bursts of unicast traffic. In some embodiments, receiving the second type of traffic includes receiving one or more of high bursts of unicast data traffic, high bursts of broadcast data traffic, unicast traffic with low latency, and broadcast traffic with low latency.

In some embodiments of the method 1200, the method includes transmitting low-throughput traffic from the station directly to the gateway AP over a long-range radio link, and transmitting high-throughput traffic from the station to the gateway AP via the at least one relay AP and over at least one short-range radio link.

Thus, the method 1200 may provide for wireless communications. It should be noted that the method 1200 is just one implementation and that the operations of the method 900 may be rearranged or otherwise modified such that other implementations are possible.

Figure 13:
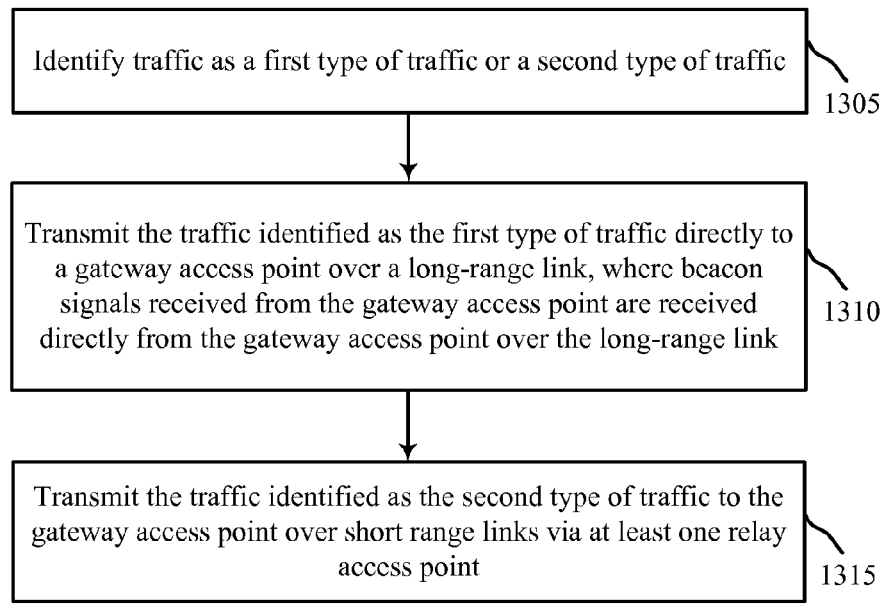

FIG. 13 is a flow chart illustrating an example of a method 1300 for wireless communications. For clarity, the method 1300 is described below with reference to one of the APs, stations, and devices shown in FIG. 1, 2A, 2B, 2C, 3A, 3B, 4A, 4B, 5A, 5B, 6, 7, and/or 8. In one embodiment, one of the stations may execute one or more sets of codes to control the functional elements of the station to perform the functions described below.

At block 1305, traffic may be identified as a first type of traffic or a second type of traffic.

At block 1310, the traffic identified as the first type of traffic may be transmitted directly to a gateway AP (e.g., gateway AP 105-a) over a long-range link (e.g., communications link 220), where beacon signals received from the gateway AP are received directly from the gateway AP over the long-range link.

At block 1315, the traffic identified as the second type of traffic may be transmitted to the gateway AP over short-range links (e.g., communications link 230, 235) via at least one relay AP (e.g., relay AP 105-*b*).

Thus, the method 1300 may provide for wireless communications. It should be noted that the method 1300 is just one implementation and that the operations of the method 1300 may be rearranged or otherwise modified such that other implementations are possible.

Figure 14:
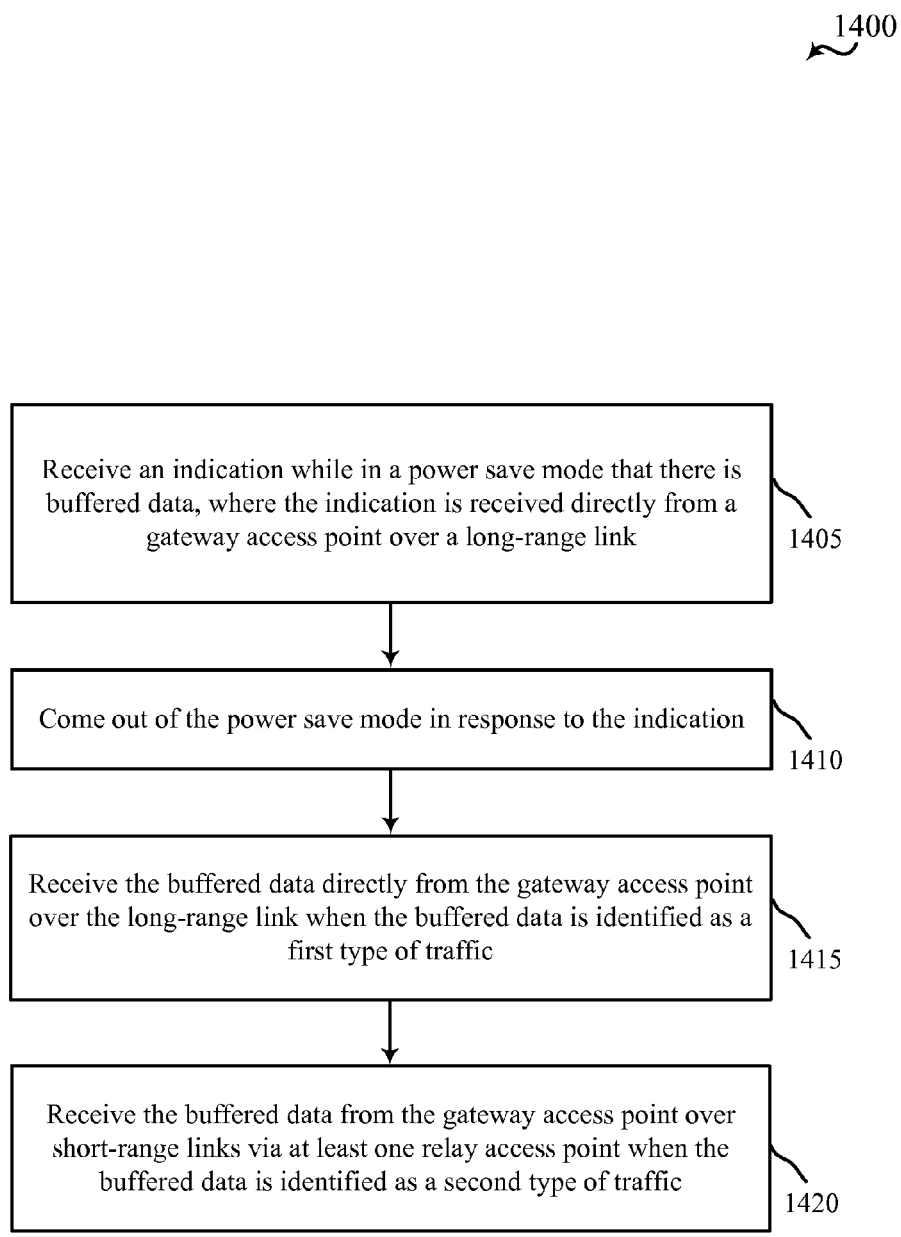

FIG. 14 is a flow chart illustrating an example of a method 1400 for wireless communications. For clarity, the method 1400 is described below with reference to one of the APs, stations, and devices shown in FIGS. 1, 2A, 2B, 2C, 3A, 3B, 4A, 4B, 5A, 5B, 6, 7, and/or 8. In one embodiment, one of the stations may execute one or more sets of codes to control the functional elements of the stations to perform the functions described below.

At block 1405, an indication may be received while in a power save mode that there is buffered data, where the indication (e.g., TIM) is received directly from a gateway AP (e.g., gateway AP 105-*a*) over a long-range link (e.g., communications link 220).

At block 1410, in response to the indication, come out of the power save mode.

At block 1415, the buffered data may be received directly from the gateway AP over the long-range link when the buffered data is identified as the first type of traffic.

At block 1420, the buffered data may be received from the gateway AP over short-range links via at least one relay AP (e.g., relay AP 105-*b*) when the buffered data is identified as the second type of traffic.

Thus, the method 1400 may provide for wireless communications. It should be noted that the method 1400 is just one implementation and that the operations of the method 1400 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method for wireless communications, comprising:
associating with a station to establish a first wireless link in a wireless local area network (WLAN) concurrently with a second wireless link in the WLAN, the first wireless link directly from a gateway access point to the station to transmit a first type of traffic comprising beacon signals, and the second wireless link between the gateway access point and the station via at least one relay access point in the WLAN to transmit a second type of traffic;
identifying traffic buffered at the gateway access point for the station as the beacon signals or the second type of traffic;
transmitting the traffic identified as the beacon signals from the gateway access point directly to the station; and
transmitting the traffic identified as the second type of traffic from the gateway access point to the station via the at least one relay access point.

2. The method of claim 1, wherein:
transmitting the second type of traffic comprises transmitting high-throughput traffic.

3. The method of claim 1, wherein transmitting the first type of traffic comprises transmitting the beacon signals over a long-range radio link.

4. The method of claim 3, wherein the long-range radio link comprises a 2 GHz band link or a sub-1 GHz band link.

5. The method of claim 1, wherein transmitting the second type of traffic comprises transmitting the second type of traffic over at least one short-range radio link.

6. The method of claim 5, wherein the at least one short-range radio link comprises a 5 GHz band link.

7. The method of claim 1, wherein the first type of traffic comprises one or more of:
low bursts of broadcast traffic;
low bursts of multicast traffic; and
low bursts of unicast traffic.

8. The method of claim 1, wherein transmitting the second type of traffic comprises transmitting one or more of:
high bursts of unicast data traffic;
high bursts of broadcast data traffic;
unicast traffic with low latency; and
broadcast traffic with low latency.

9. The method of claim 1, further comprising:
receiving the beacon signals at the gateway access point directly from the station over a long-range radio link; and
receiving high-throughput traffic at the gateway access point from the station via the at least one relay access point and over at least one short-range radio link.

10. A method for wireless communications, comprising:
associating with a gateway access point to establish a first wireless link in a wireless local area network (WLAN) concurrently with a second wireless link in the WLAN, the first wireless link directly from the gateway access point to a station to transmit a first type of traffic comprising beacon signals, and the second wireless link between the gateway access point and the station via at least one relay access point in the WLAN to transmit a second type of traffic;
receiving the beacon signals at the station directly from the gateway access point; and
receiving the second type of traffic at the station from the gateway access point via at least one relay access point, wherein the gateway access point has identified traffic buffered at the gateway access point for the station as beacon signals to transmit directly to the station or the second type of traffic to transmit to the station via the at least one relay access point.

11. The method of claim 10, wherein:
receiving the second type of traffic comprises receiving high-throughput traffic.

12. The method of claim 10, wherein receiving the first type of traffic comprises receiving the beacon signals over a long-range radio link.

13. The method of claim 12, wherein the long-range radio link comprises a 2 GHz band link or a sub-1 GHz band link.

14. The method of claim 10, wherein receiving the second type of traffic comprises receiving the second type of traffic over at least one short-range radio link.

15. The method of claim 14, wherein the at least one short-range radio link comprises a 5 GHz band link.

16. The method of claim 10, wherein the first type of traffic comprises one or more of:
low bursts of broadcast traffic;
low bursts of multicast traffic; and
low bursts of unicast traffic.

17. The method of claim 10, wherein receiving the second type of traffic comprises receiving one or more of:
high bursts of unicast data traffic;
high bursts of broadcast data traffic;
unicast traffic with low latency; and
broadcast traffic with low latency.

18. The method of claim 10, further comprising:
transmitting the beacon signals from the station directly to the gateway access point over a long-range radio link; and
transmitting the high-throughput traffic from the station to the gateway access point via the at least one relay access point and over at least one short-range radio link.

19. A device for wireless communications, comprising:
a gateway access point configured to:
associate with a station to establish a first wireless link in a wireless local area network (WLAN) concurrently with a second wireless link in the WLAN, the first wireless link directly from the gateway access point to the station to transmit a first type of traffic comprising beacon signals, and the second wireless link between the gateway access point and the station via at least one relay access point in the WLAN to transmit a second type of traffic
identify traffic buffered at the gateway access point for the station as the beacon signals or the second type of traffic;
transmit the traffic identified as the beacon signals from the gateway access point directly to the station; and
transmit the traffic identified as the second type of traffic from the gateway access point to the station via the at least one relay access point.

20. The device of claim 19, wherein the gateway access point is configured to transmit the beacon signals directly to the station over a 2 GHz band link or a sub-1 GHz band link.

21. The device of claim 19, wherein the gateway access point is configured to transmit the second type of traffic to the at least one relay access point over at least one 5 GHz band link.

22. The device of claim 19, wherein:
the first type of traffic comprises one or more of:
low bursts of broadcast traffic;
low bursts of multicast traffic; and
low bursts of unicast traffic; and
the second type of traffic comprises one or more of:
high bursts of unicast data traffic;
high bursts of broadcast data traffic;
unicast traffic with low latency; and
broadcast traffic with low latency.

23. A device for wireless communications, comprising:
a station configured to:
associate with a gateway access point to establish a first wireless link in a wireless local area network (WLAN) concurrently with a second wireless link in the WLAN, the first wireless link directly from the gateway access point to the station to transmit a first type of traffic comprising beacon signals, and the second wireless link between the gateway access point and the station via at least one relay access point in the WLAN to transmit a second type of traffic;
receive the beacon signals at the station directly from the gateway access point; and
receive the second type of traffic at the station from the gateway access point via at least one relay access point, wherein the gateway access point has identified traffic buffered at the gateway access point for the station as beacon signals to transmit directly to the station or the second type of traffic to transmit to the station via the at least one relay access point.

24. The device of claim 23, wherein the station is configured to receive the beacon signals directly from the gateway access point over a 2 GHz band link or a sub-1 GHz band link.

25. The device of claim 23, wherein the station is configured to receive the second type of traffic from the gateway access point via the at least one relay access point and over at least one 5 GHz band link.

26. The device of claim 23, wherein:
the first type of traffic comprises one or more of:
low bursts of broadcast traffic;
low bursts of multicast traffic; and
low bursts of unicast traffic; and
the second type of traffic comprises one or more of:
high bursts of unicast data traffic;
high bursts of broadcast data traffic;
unicast traffic with low latency; and
broadcast traffic with low latency.

27. A system for wireless communications, comprising:
a station;
a gateway access point communicatively coupled with the station, wherein the gateway access point is configured to
associate with the station to establish a first wireless link in a wireless local area network (WLAN) concurrently with a second wireless link in the WLAN, the first wireless link directly from the gateway access point to the station to transmit a first type of traffic comprising beacon signals, and the second wireless link between the gateway access point and the station via at least one relay access point in the WLAN to transmit a second type of traffic;
identify traffic buffered at the gateway access point for the station as the beacon signals or the second type of traffic; and
transmit the traffic identified as the beacon signals from the gateway access point directly to the station; and the at least one relay access point communicatively coupled with the gateway access point and the station, the gateway access point being configured to
transmit the traffic identified as the second type of traffic to the station via the at least one relay access point and over at least one short-range radio link.

28. An apparatus for wireless communications, comprising:
means for associating with a station to establish a first wireless link in a wireless local area network (WLAN) concurrently with a second wireless link in the WLAN, the first wireless link directly from a gateway access point to the station to transmit a first type of traffic comprising beacon signals, and the second wireless link between the gateway access point and the station via at least one relay access point in the WLAN to transmit a second type of traffic;
means for identifying traffic buffered at the gateway access point for the station as the beacon signals or the second type of traffic;
means for transmitting the traffic identified as the beacon signals from the gateway access point directly to the station; and
means for transmitting the traffic identified as the second type of traffic from the gateway access point to the station via the at least one relay access point.

29. The apparatus of claim 28, wherein:
the means for transmitting the second type of traffic comprises means for transmitting high-throughput traffic.

30. The apparatus of claim 28, wherein the means for transmitting the beacon signals comprises means for transmitting the first type of traffic over a 2 GHz band link or a sub-1 GHz band link.

31. The apparatus of claim 28, wherein the means for transmitting the second type of traffic comprises means for transmitting the second type over at least one 5 GHz band link.

32. The apparatus of claim 28, wherein:
the first type of traffic comprises one or more of:
low bursts of broadcast traffic;
low bursts of multicast traffic; and
low bursts of unicast traffic; and
the means for transmitting the second type of traffic comprises means for transmitting one or more of:
high bursts of unicast data traffic;
high bursts of broadcast data traffic;
unicast traffic with low latency; and
broadcast traffic with low latency.

33. An apparatus for wireless communications, comprising:
means for associating with a gateway access point to establish a first wireless link in a wireless local area network (WLAN) concurrently with a second wireless link in the WLAN, the first wireless link directly from the gateway access point to a station to transmit a first type of traffic comprising beacon signals, and the second wireless link between the gateway access point and the station via at least one relay access point in the WLAN to transmit a second type of traffic;
means for receiving the beacon signals at the station directly from the gateway access point; and
means for receiving the second type of traffic at the station from the gateway access point via at least one relay access point, wherein the gateway access point has identified traffic buffered at the gateway access point for the station as beacon signals to transmit directly to the station or the second type of traffic to transmit to the station via the at least one relay access point.

34. The apparatus of claim 33, wherein:
the means for receiving the second type of traffic comprises means for receiving high-throughput traffic.

35. The apparatus of claim 33, wherein the means for receiving the first type of traffic comprises means for receiving the first type of traffic over a 2 GHz band link or a sub-1 GHz band link.

36. The apparatus of claim 33, wherein the means for receiving the second type of traffic comprises means for receiving the second type over at least one 5 GHz band link.

37. The apparatus of claim 33, wherein:
the first type of traffic comprises one or more of:
low bursts of broadcast traffic;
low bursts of multicast traffic; and
low bursts of unicast traffic; and
the means for receiving the second type of traffic comprises means for receiving one or more of:
high bursts of unicast data traffic;
high bursts of broadcast data traffic;
unicast traffic with low latency; and
broadcast traffic with low latency.

38. A computer program product, comprising:
a non-transitory computer-readable medium comprising:
code for causing at least one computer to associate with a station to establish a first wireless link in a wireless local area network (WLAN) concurrently with a second wireless link in the WLAN, the first wireless link directly from a gateway access point to the station to transmit a first type of traffic comprising beacon signals, and the second wireless link between the gateway access point and the station via at least one relay access point in the WLAN to transmit a second type of traffic;
code for causing the at least one computer to identify traffic buffered at the gateway access point for the station as the beacon signals or the second type of traffic;
code for causing the at least one computer to transmit the traffic identified as the beacon signals from the gateway access point directly to the station; and
code for causing the at least one computer to transmit the traffic identified as the second type of traffic from the gateway access point to the station via the at least one relay access point.

39. A computer program product, comprising:
a non-transitory computer-readable medium comprising:
code for causing at least one computer to associate with a gateway access point to establish a first wireless link in a wireless local area network (WLAN) concurrently with a second wireless link in the WLAN, the first wireless link directly from the gateway access point to a station to transmit a first type of traffic comprising beacon signals, and the second wireless link between the gateway access point and the station via at least one relay access point in the WLAN to transmit a second type of traffic;
code for causing the at least one computer to receive the beacon signals at the station directly from the gateway access point; and
code for causing the at least one computer to receive the second type of traffic at the station from the gateway access point via at least one relay access point, wherein the gateway access point has identified traffic buffered at the gateway access point for the station as beacon signals to transmit directly to the station or the second type of traffic to transmit to the station via the at least one relay access point.

* * * * *